US012293688B2

(12) United States Patent
Pyun et al.

(10) Patent No.: US 12,293,688 B2
(45) Date of Patent: May 6, 2025

(54) DISPLAY DEVICE AND METHOD FOR INSPECTING THE SAME

(71) Applicant: Samsung Display Co., Ltd., Yongin-si (KR)

(72) Inventors: Kihyun Pyun, Yongin-si (KR); Jungeon An, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/539,670

(22) Filed: Dec. 14, 2023

(65) Prior Publication Data

US 2024/0242646 A1 Jul. 18, 2024

(30) Foreign Application Priority Data

Jan. 18, 2023 (KR) ........................ 10-2023-0007303

(51) Int. Cl.
*G09G 3/00* (2006.01)
*G09G 3/20* (2006.01)

(52) U.S. Cl.
CPC ........... *G09G 3/006* (2013.01); *G09G 3/2096* (2013.01); *G09G 2300/0819* (2013.01); *G09G 2300/0842* (2013.01); *G09G 2310/08* (2013.01); *G09G 2320/0257* (2013.01); *G09G 2330/021* (2013.01); *G09G 2330/028* (2013.01)

(58) Field of Classification Search
CPC ........................... G09G 3/006; G09G 2330/12
See application file for complete search history.

(56) References Cited

U.S. PATENT DOCUMENTS

2017/0032722 A1* 2/2017 Wang .................. G09G 3/3266
2020/0402432 A1* 12/2020 Yang .................... G09G 3/3233

FOREIGN PATENT DOCUMENTS

KR 101213406 B1 12/2012

* cited by examiner

*Primary Examiner* — Gustavo Polo
(74) *Attorney, Agent, or Firm* — CANTOR COLBURN LLP

(57) ABSTRACT

A display device includes a display panel including pixels, a gate driver configured to output a first gate signal for writing data voltages to the pixels and a second gate signal for applying an initialization voltage to the pixels, which have activation levels, to the pixels in a misconnection detection period, a data driver configured to output the data voltages to the pixels in the misconnection detection period, a power voltage generator electrically connected to the data driver through a cable and configured to output a first power voltage to the display panel in the misconnection detection period, and a timing controller electrically connected to the data driver through the cable and configured to perform a protection operation by detecting misconnection of the cable based on the first power voltage in the misconnection detection period.

20 Claims, 18 Drawing Sheets

DISPLAY DEVICE AND METHOD FOR INSPECTING THE SAME

This application claims priority to Korean Patent Application No. 10-2023-0007303, filed on Jan. 18, 2023, and all the benefits accruing therefrom under 35 USC § 119, the content of which in its entirety is herein incorporated by reference.

BACKGROUND

1. Field

The invention relates to a display device and a method for inspecting the display device, and more particularly, to a display device including a cable to which a power voltage is applied and a method for inspecting the same.

2. Description of the Related Art

In general, a display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals to the gate lines, the data driver may provide data voltages to the data lines, and the timing controller may control the gate driver and the data driver.

A power voltage for driving the pixels may be applied to the display panel through a cable. In addition, the display device may detect misconnection of the cable in order to prevent problems that may occur when the cable is not normally connected.

SUMMARY

In an embodiment, a display device may include a misconnection detection period.

In an embodiment, the invention includes a method for inspecting the display device.

However, the invention is not limited thereto. Thus, the invention may be extended without departing from the spirit and the scope of the invention.

According to embodiments, a display device may include a display panel including pixels, a gate driver configured to output a first gate signal for writing data voltages to the pixels and a second gate signal for applying an initialization voltage to the pixels, each of which have activation levels, in a misconnection detection period, a data driver configured to output the data voltages to the pixels in the misconnection detection period, a power voltage generator electrically connected to the data driver through a cable and configured to output a first power voltage to the display panel in the misconnection detection period, and a timing controller electrically connected to the data driver through the cable and configured to perform a protection operation by detecting misconnection of the cable based on the first power voltage in the misconnection detection period.

In an embodiment, each of the pixels may include a driving transistor including a control electrode connected to a first node, a first electrode configured to receive the first power voltage, and a second electrode connected to a second node, a first transistor including a control electrode configured to receive the first gate signal, a first electrode configured to receive the data voltages, and a second electrode connected to the first node, a second transistor including a control electrode configured to receive the second gate signal, a first electrode connected to the second node, and a second electrode configured to receive the initialization voltage, a storage capacitor including a first electrode connected to the first node and a second electrode connected to the second node, and a light emitting element including a first electrode connected to the second node and a second electrode configured to receive a second power voltage.

In an embodiment, the misconnection detection period may follow a power stabilization period and may precede a sensing period.

In an embodiment, the power voltage generator may be configured to not output the first power voltage to the display panel in the power stabilization period.

In an embodiment, the gate driver may be configured to sequentially output the first gate signal having the activation level to pixel rows including the pixels in the sensing period.

In an embodiment, the gate driver may be configured to simultaneously output the first gate signal and the second gate signal, each of which have the activation levels, to the pixels in the misconnection detection period.

In an embodiment, the data driver may be configured to not output the data voltages when the protection operation is performed. In addition, the gate driver may be configured to not output the first gate signal and the second gate signal when the protection operation is performed. Further, the power voltage generator may be configured to not output the first power voltage when the protection operation is performed.

In an embodiment, the display device may further include data films including the data driver and connected to the display panel, a first source printed circuit board connected to a first part of the data films, a second source printed circuit board connected to a second part of the data films, which is different from the first part of the data films, and a control printed circuit board connected to the cable and including the power voltage generator and the timing controller. In addition, the cable may include a first cable connected to the first source printed circuit board and a second cable connected to the second source printed circuit board.

In an embodiment, the timing controller may be configured to detect misconnection of the first cable and the second cable based on a first feedback voltage generated by feeding back the first power voltage in the first source printed circuit board and a second feedback voltage generated by feeding back the first power voltage in the second source printed circuit board.

In an embodiment, the display device may further include a first comparator configured to generate a first alert signal having a high voltage level when the first feedback voltage is greater than or equal to the second feedback voltage by a reference voltage, and a second comparator configured to generate a second alert signal having the high voltage level when the second feedback voltage is greater than or equal to the first feedback voltage by the reference voltage.

In an embodiment, the timing controller may be configured to generate a first sampling alert signal by sampling the first alert signal, to generate a second sampling alert signal by sampling the second alert signal, to output a final alert signal according to XOR logic based on the first sampling alert signal and the second sampling alert signal, and to perform the protection operation based on the final alert signal.

In an embodiment, the timing controller may be configured to generate a count value by counting the final alert signal having the high voltage level during a reference number of frames and to perform the protection operation when the count value is greater than a reference count value.

According to embodiments, a display device may include a display panel including pixels, a gate driver configured to output a first gate signal for writing data voltages to the pixels and a second gate signal for applying an initialization voltage to the pixels, each of which have activation levels, in a misconnection detection period, a data driver configured to output the data voltages to the pixels in the misconnection detection period, a power voltage generator electrically connected to the data driver through a cable and configured to output a first power voltage to the display panel in the misconnection detection period, and a timing controller electrically connected to the data driver through the cable and configured to perform a protection operation by detecting misconnection of the cable based on a power current of a power line to which the first power voltage is applied in the misconnection detection period.

In an embodiment, the misconnection detection period may follow a power stabilization period and may precede a sensing period. In addition, the power voltage generator may be configured to not output the first power voltage to the display panel in the power stabilization period. Further, the gate driver may be configured to sequentially output the first gate signal having the activation level to pixel rows including the pixels in the sensing period.

In an embodiment, the data driver may be configured to not output the data voltages when the protection operation is performed. In addition, the gate driver may be configured to not output the first gate signal and the second gate signal when the protection operation is performed. Further, the power voltage generator may be configured to not output the first power voltage when the protection operation is performed.

In an embodiment, the display device may further include data films including the data driver and connected to the display panel, a first source printed circuit board connected to a first part of the data films, a second source printed circuit board connected to a second part of the data films, which is different from the first part of the data films, and a control printed circuit board connected to the cable and including the power voltage generator and the timing controller. In addition, the cable may include a first cable connected to the first source printed circuit board and a second cable connected to the second source printed circuit board.

In an embodiment, the display device may further include a first current sensor configured to generate a first sensing current by sensing the power current output to the first cable in the misconnection detection period, and a second current sensor configured to generate a second sensing current by sensing the power current output to the second cable in the misconnection detection period.

In an embodiment, the display panel may include a first display region in which the pixels configured to receive the data voltages from the first part of the data films are disposed, and a second display region in which the pixels configured to receive the data voltages from the second part of the data films are disposed. In addition, the timing controller may be configured to detect misconnection of the first cable and the second cable based on a first load of the first display region in the misconnection detection period and a second load of the second display region in the misconnection detection period.

In an embodiment, the timing controller may be configured to determine a first target current corresponding to the first load, to determine a first reference current corresponding to the first target current, and to perform the protection operation when the first sensing current is greater than the first reference current. In addition, the timing controller may be configured to determine a second target current corresponding to the second load, to determine a second reference current corresponding to the second target current, and to perform the protection operation when the second sensing current is greater than the second reference current.

According to embodiments, a method for inspecting a display device may include outputting a first gate signal for writing data voltages to pixels and a second gate signal for applying an initialization voltage to the pixels, each of which have activation levels, in a misconnection detection period, outputting the data voltages to the pixels in the misconnection detection period, outputting a first power voltage to a display panel including the pixels through a cable in the misconnection detection period, and performing a protection operation by detecting misconnection of the cable based on the first power voltage in the misconnection detection period.

Therefore, a display device according to embodiments may output a first gate signal and a second gate signal, each of which have activation levels, to pixels in a misconnection detection period, so that light emission of the pixels can be minimized in the misconnection detection period.

In addition, the display device may detect misconnection of a cable, so that an overcurrent generated due to the misconnection can be prevented.

The effects of the invention are not limited thereto. Thus, the effects of the invention may be extended without departing from the spirit and the scope of the present disclosure.

DETAILED DESCRIPTION OF THE EMBODIMENTS

Figure 1:
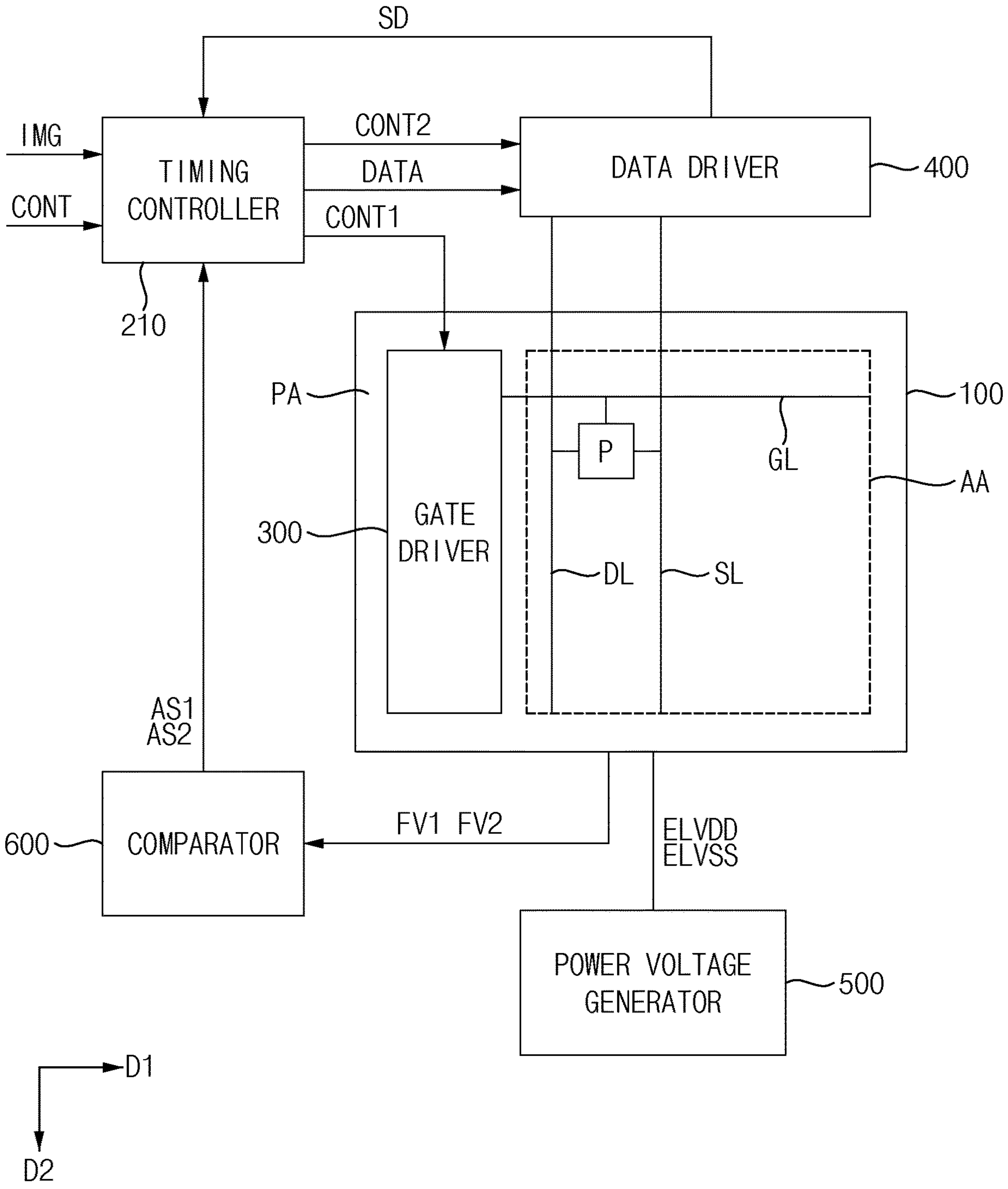
FIG. 1 is a schematic block diagram showing a display device, according to an embodiment.

The invention now will be described more fully hereinafter with reference to the accompanying drawings, in which various embodiments are shown. This invention may however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element (or a region, a layer, a portion, or the like) is referred to as being related to another such as being "on", "connected to" or "coupled to" another element, it may be directly disposed on, connected or coupled to the other element, or intervening elements may be disposed therebetween.

Like reference numerals or symbols refer to like elements throughout. In the drawings, the thickness, the ratio, and the size of the element are exaggerated for effective description of the technical contents. As used herein, the term "and/or" includes any and all combinations of one or more of the associated listed items.

The term "and/or," includes all combinations of one or more of which associated configurations may define.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the scope of the inventive concept. Similarly, a second element, component, region, layer or section may be termed a first element, component, region, layer or section. As used herein, the singular forms, "a", "an" and "the" are intended to include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be further understood that the terms "comprise", "includes" and/or "have", when used in this specification, specify the presence of stated features, integers, steps, operations, elements, components, and/or groups thereof, but do not preclude the presence or addition of one or more other features, integers, steps, operations, elements, components, and/or groups thereof. As used herein, being "disposed directly on" may mean that there is no additional layer, film, region, plate, or the like between a part and another part such as a layer, a film, a region, a plate, or the like. For example, being "disposed directly on" may mean that two layers or two members are disposed without using an additional member such as an adhesive member, therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic block diagram showing a display device, according to an embodiment.

In an embodiment, referring to FIG. 1, a display device may include a display panel 100, a timing controller 210, a gate driver 300, a data driver 400, a power voltage generator 500, and a comparator 600. According to one embodiment, the timing controller 210 and the data driver 400 may be integrated on a single chip.

In an embodiment, the display panel 100 may include a display region AA configured to display an image, and a peripheral region PA that is adjacent to the display region AA. According to one embodiment, the gate driver 300 may be mounted on the peripheral region PA.

In an embodiment, the display panel 100 may include a plurality of gate lines GL, a plurality of data lines DL, a plurality of sensing lines SL, and a plurality of pixels P electrically connected to the gate lines GL, the data lines DL, and the sensing lines SL. The gate lines GL may extend in a first direction D1, and the data lines DL and the sensing lines SL may extend in a second direction D2 intersecting the first direction D1.

In an embodiment, the timing controller 210 may receive input image data IMG and an input control signal CONT from a main processor (e.g., a graphic processing unit (GPU), etc.). For example, the input image data IMG may include red image data, green image data, and blue image data. According to an embodiment, the input image data IMG may further include white image data. As another embodiment, the input image data IMG may include magenta image data, yellow image data, and cyan image data. The input control signal CONT may include a master clock signal and/or a data enable signal. The input control signal CONT may further include a vertical synchronization signal and/or a horizontal synchronization signal.

In an embodiment, the timing controller 210 may generate a first control signal CONT1, a second control signal CONT2, and a data signal DATA based on the input image data IMG and the input control signal CONT.

In an embodiment, the timing controller 210 may generate the first control signal CONT1 for controlling an operation of the gate driver 300 based on the input control signal CONT to output the generated first control signal CONT1 to the gate driver 300. The first control signal CONT1 may include a vertical start signal and/or a gate clock signal.

In an embodiment, the timing controller 210 may generate the second control signal CONT2 for controlling an operation of the data driver 400 based on the input control signal CONT to output the generated second control signal CONT2 to the data driver 400. The second control signal CONT2 may include a horizontal start signal and/or a load signal.

In an embodiment, the timing controller 210 may receive the input image data IMG and the input control signal CONT to generate the data signal DATA. The timing controller 210 may output the data signal DATA to the data driver 400.

In an embodiment, the gate driver 300 may generate gate signals for driving the gate lines GL in response to the first control signal CONT1 received from the timing controller 210. The gate driver 300 may output the gate signals to the gate lines GL. For example, the gate driver 300 may sequentially output the gate signals to the gate lines GL.

In an embodiment, the data driver 400 may receive the second control signal CONT2 and the data signal DATA from the timing controller 210. The data driver 400 may generate data voltages obtained by converting the data signal DATA into an analog voltage. The data driver 400 may output the data voltages to the data lines DL.

In an embodiment, the data driver 400 may generate sensing data SD by sensing the pixels P (e.g., sensing a threshold voltage, a mobility characteristic, and the like of a driving transistor (DT of FIG. 2) of each of the pixels P). The data driver 400 may output the sensing data SD to the timing controller 210. The timing controller 210 may compensate for the input image data IMG based on the sensing data SD.

In an embodiment, the power voltage generator 500 may generate a first power voltage ELVDD and a second power voltage ELVSS for driving the pixels P to output the generated first power voltage ELVDD and the generated second power voltage ELVSS to the display panel 100. For example, the first power voltage ELVDD may be a high power voltage. For example, the second power voltage ELVSS may be a low power voltage.

An embodiment of the comparator 600 will be described in detail below.

Figure 2:
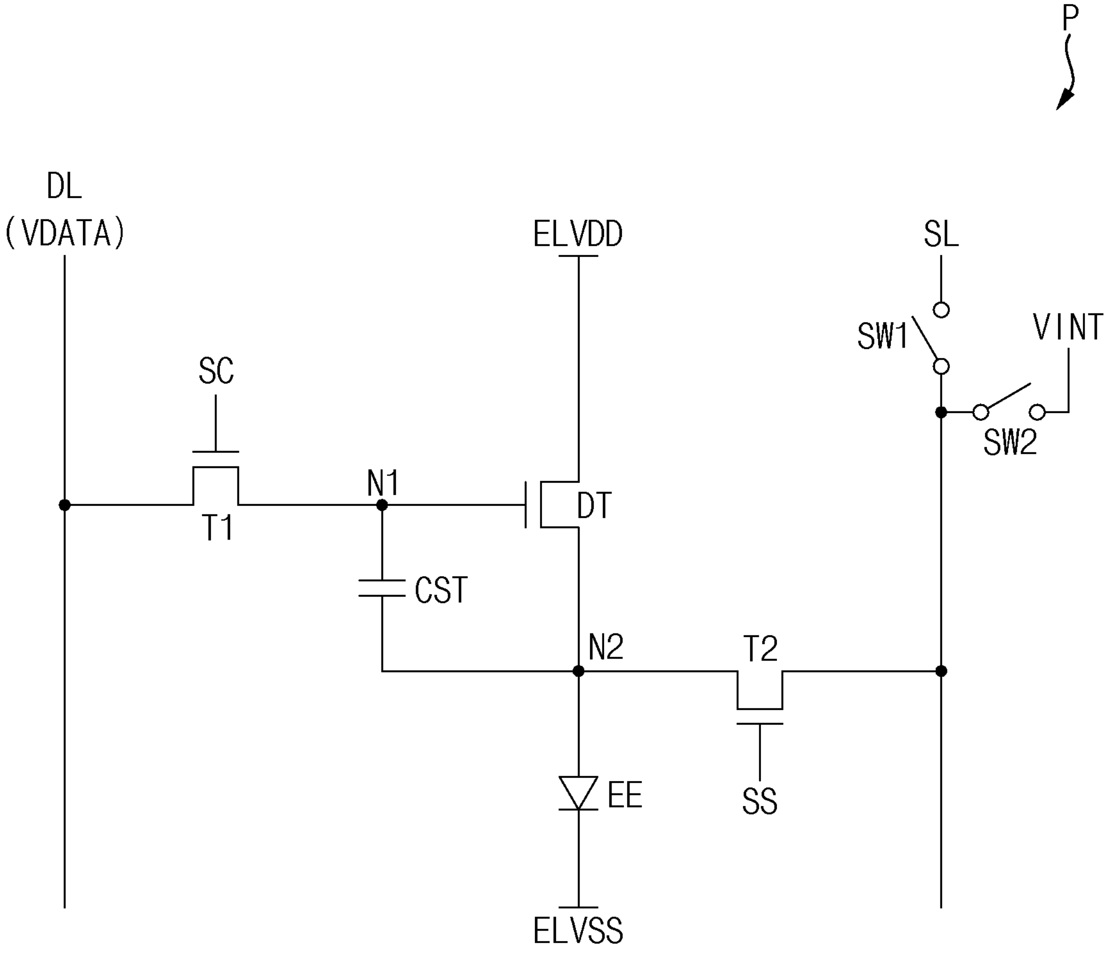
FIG. 2 is a schematic circuit diagram showing one example of a pixel of FIG. 1, according to an embodiment.

FIG. 2 is a circuit diagram showing one example of a pixel P of FIG. 1, according to an embodiment.

In an embodiment and referring to FIG. 2, each of the pixels P may include a driving transistor DT including a control electrode connected to a first node N1, a first electrode configured to receive the first power voltage ELVDD, and a second electrode connected to a second node N2, a first transistor T1 including a control electrode configured to receive a first gate signal SC, a first electrode configured to receive the data voltages VDATA, and a second electrode connected to the first node N1, a second transistor T2 including a control electrode configured to receive a second gate signal SS, a first electrode connected to the second node N2, and a second electrode configured to receive the initialization voltage VINT, a storage capacitor CST including a first electrode connected to the first node N1, and a second electrode connected to the second node N2 and a light emitting element EE including a first electrode connected to the second node N2, and a second electrode configured to receive a second power voltage ELVSS. The second electrode of the second transistor T2 may be connected to the sensing line SL, and the initialization voltage VINT may be applied to the pixel P through the sensing line SL.

In an embodiment and referring to FIGS. 1 and 2, the pixels P may receive the initialization voltage VINT or output a sensing signal (i.e., a signal of the second node N2) through the sensing line SL in response to the second gate signal SS. The data driver 400 may receive the sensing signal to sense electrical characteristics of the pixels P (e.g., sense the threshold voltage, the mobility characteristic, and the like of the driving transistor DT).

For example, in an embodiment, each of the pixels P may include a first switch SW1 configured to connect the pixels P to the data driver 400 through the sensing line SL and a second switch SW2 configured to apply the initialization voltage VINT to the pixels P. When the pixel P outputs the sensing signal, the first switch SW1 may be turned on, and the second switch SW2 may be turned off. When the pixel P receives the initialization voltage VINT, the second switch SW2 may be turned on, and the first switch SW1 may be turned off.

Figure 3:
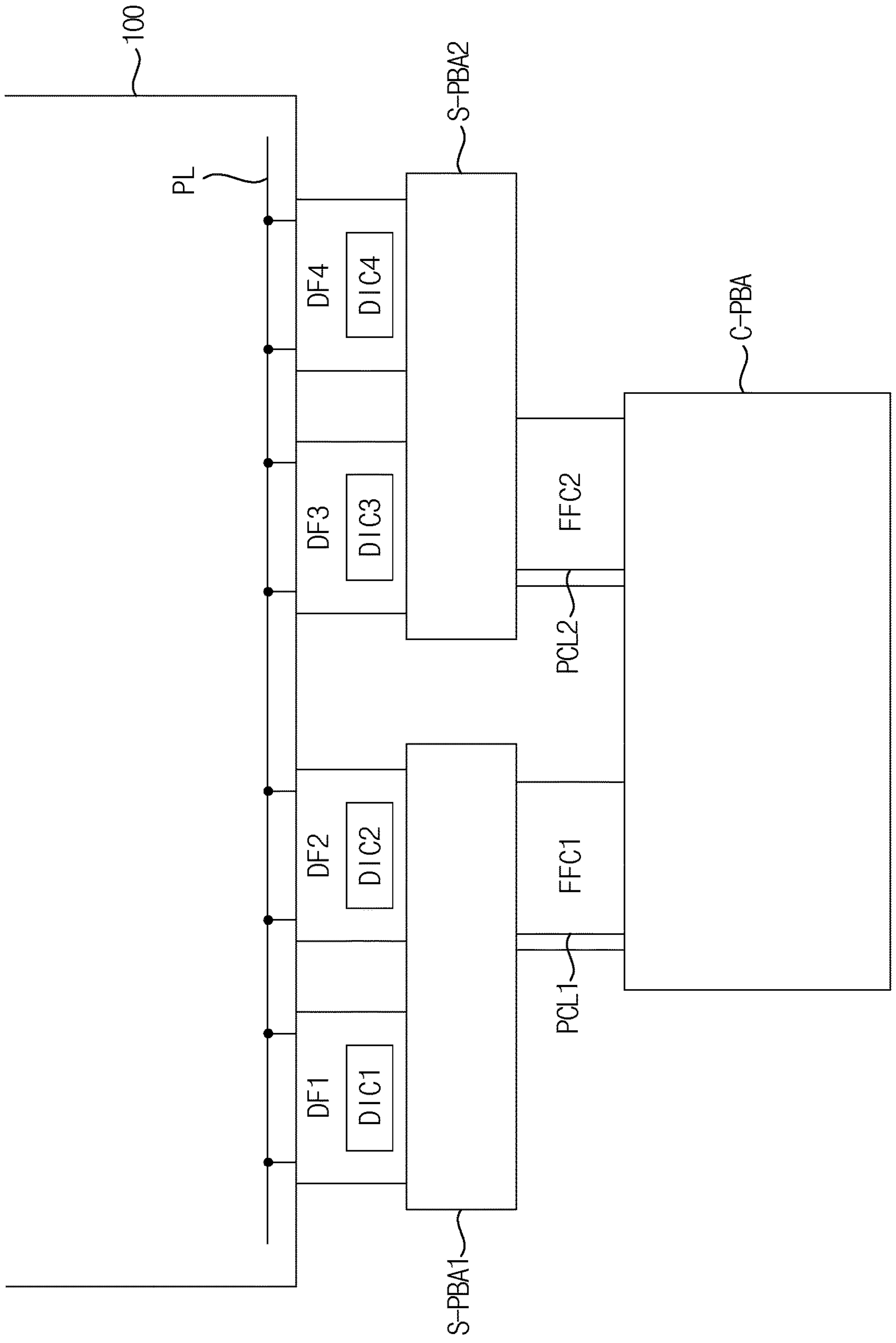
FIG. 3 is a block diagram showing one example of the display device of FIG. 1, according to an embodiment.

FIG. 3 is a view showing one example of the display device of FIG. 1, according to an embodiment.

In an embodiment and referring to FIGS. 1 to 3, the display device may include data films DF1, DF2, DF3, and DF4 connected to the display panel 100, a first source printed circuit board S-PBA1 connected to a first part DF1 and DF2 of the data films DF1, DF2, DF3, and DF4, a second source printed circuit board S-PBA2 connected to a second part DF3 and DF4 of the data films DF1, DF2, DF3, and DF4, which is different from the first part DF1 and DF2 of the data films DF1, DF2, DF3, and DF4, a first cable FFC1 connected to the first source printed circuit board S-PBA1, a second cable FFC2 connected to the second source printed circuit board S-PBA2 and a control printed circuit board C-PBA connected to the first cable FFC1 and the second cable FFC2.

In an embodiment, the data driver 400 may be implemented as a plurality of driver driving chips DIC1, DIC2, DIC3, and DIC4. The data films DF1, DF2, DF3, and DF4 may include the driver driving chips DIC1, DIC2, DIC3, and DIC4, respectively.

In an embodiment, the display panel 100 may include a first display region in which the pixels P configured to receive the data voltages from the first part DF1 and DF2 of the data films DF1, DF2, DF3, and DF4 are disposed and a second display region in which the pixels P configured to receive the data voltages from the second part DF3 and DF4 of the data films DF1, DF2, DF3, and DF4 are disposed.

In an embodiment, the control printed circuit board C-PBA may include the timing controller 210 and the power voltage generator 500. The power voltage generator 500 may output the first power voltage ELVDD to a pad line PL of the display panel 100 through a first power cable line PCL1 of the first cable FFC1 and a second power cable line PCL2 of the second cable FFC2. The pixels P may receive the first power voltage ELVDD through the pad line PL.

In an embodiment, although four data films DF1, DF2, DF3, and DF4 and four driver driving chips DIC1, DIC2, DIC3, and DIC4 have been illustratively provided in the present embodiment, the invention is not limited to the numbers of the data films DF1, DF2, DF3, and DF4 and the driver driving chips DIC1, DIC2, DIC3, and DIC4.

Figure 4:
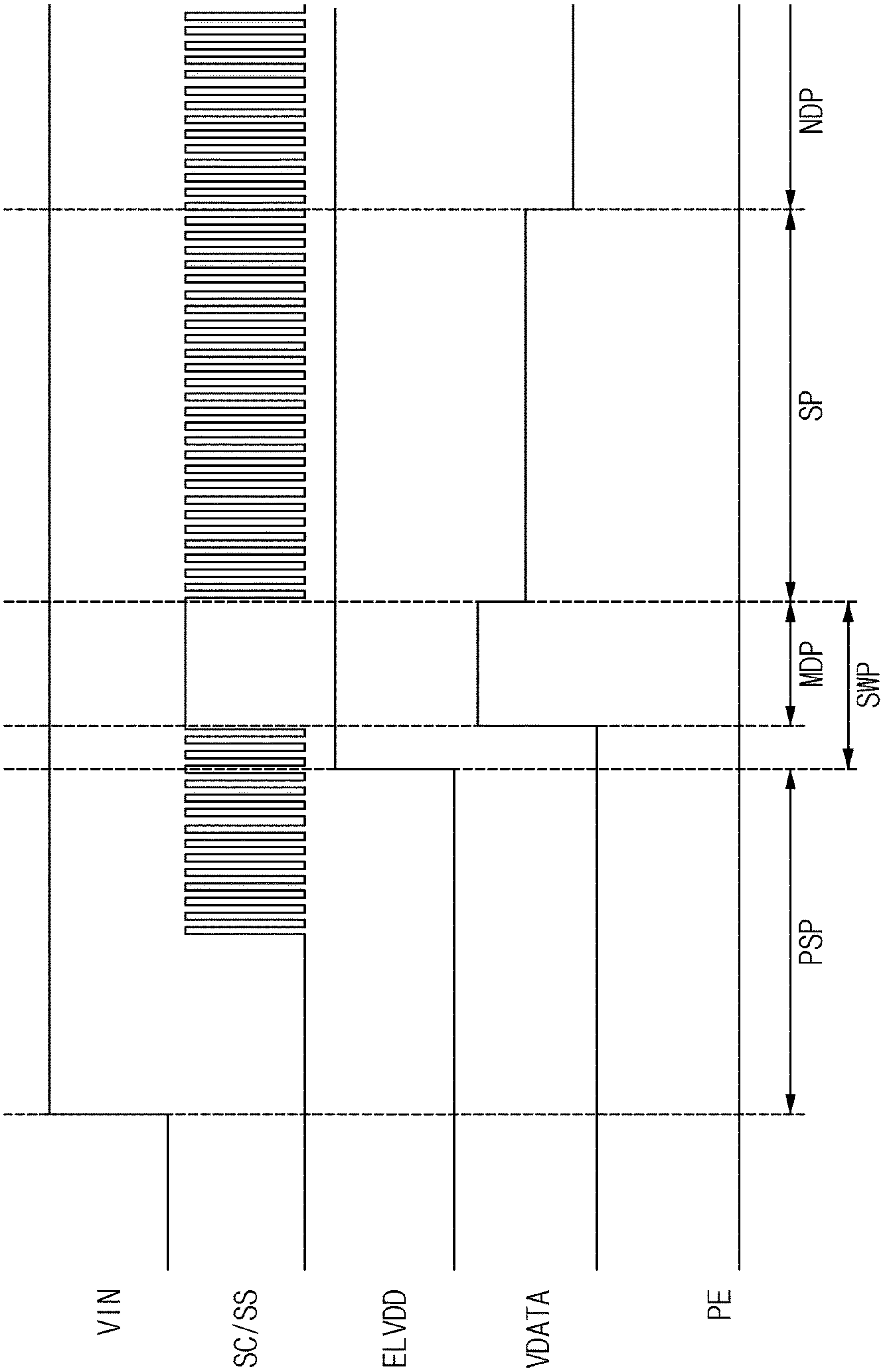
FIG. 4 is a timing diagram showing one example in which the display device of FIG. 1 is driven when misconnection of a first cable and a second cable is not detected, according to an embodiment.
Figure 5:
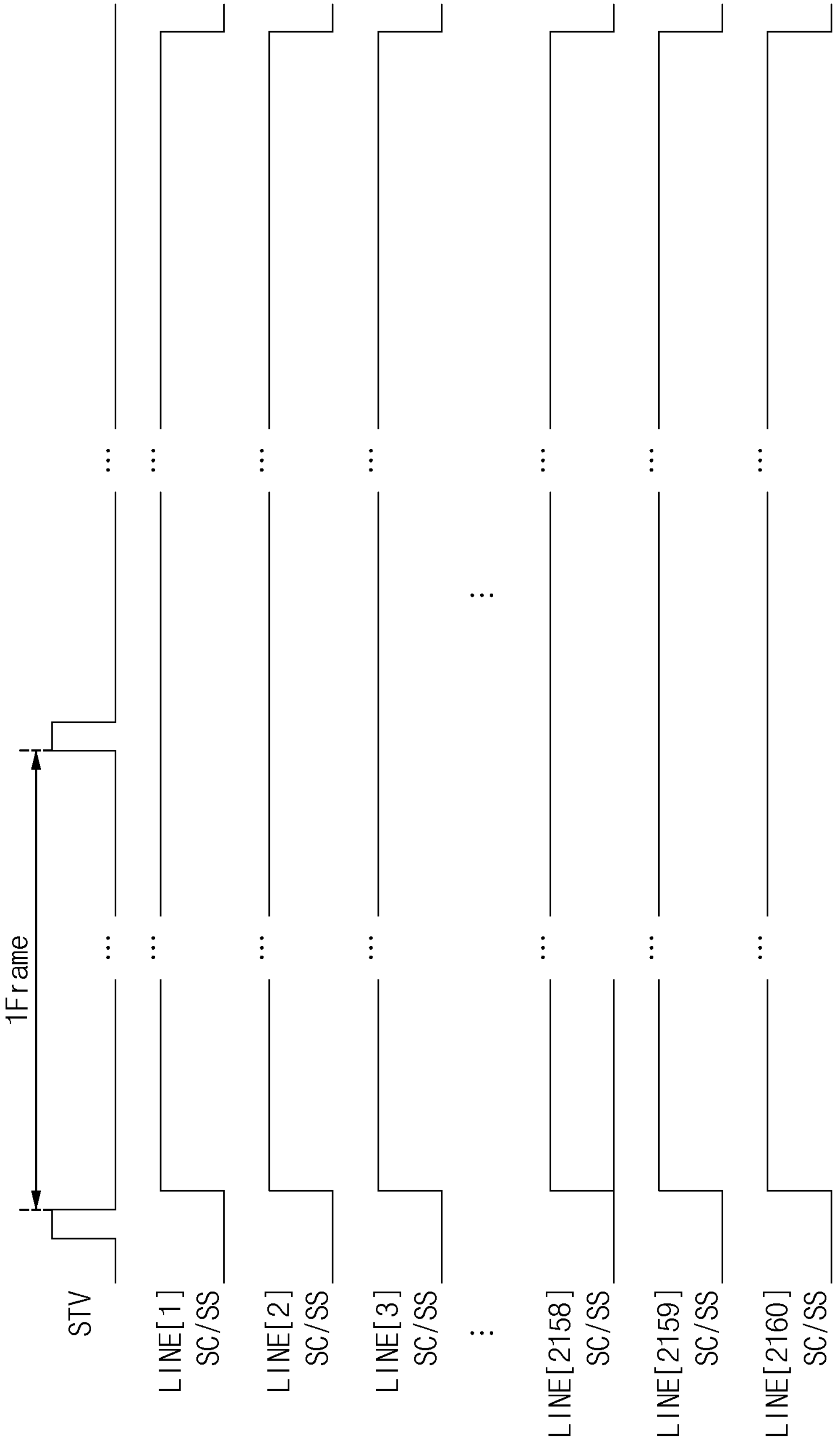
FIG. 5 is a timing diagram showing one example in which the display device of FIG. 1 is driven in a misconnection detection period, according to an embodiment.
Figure 6:
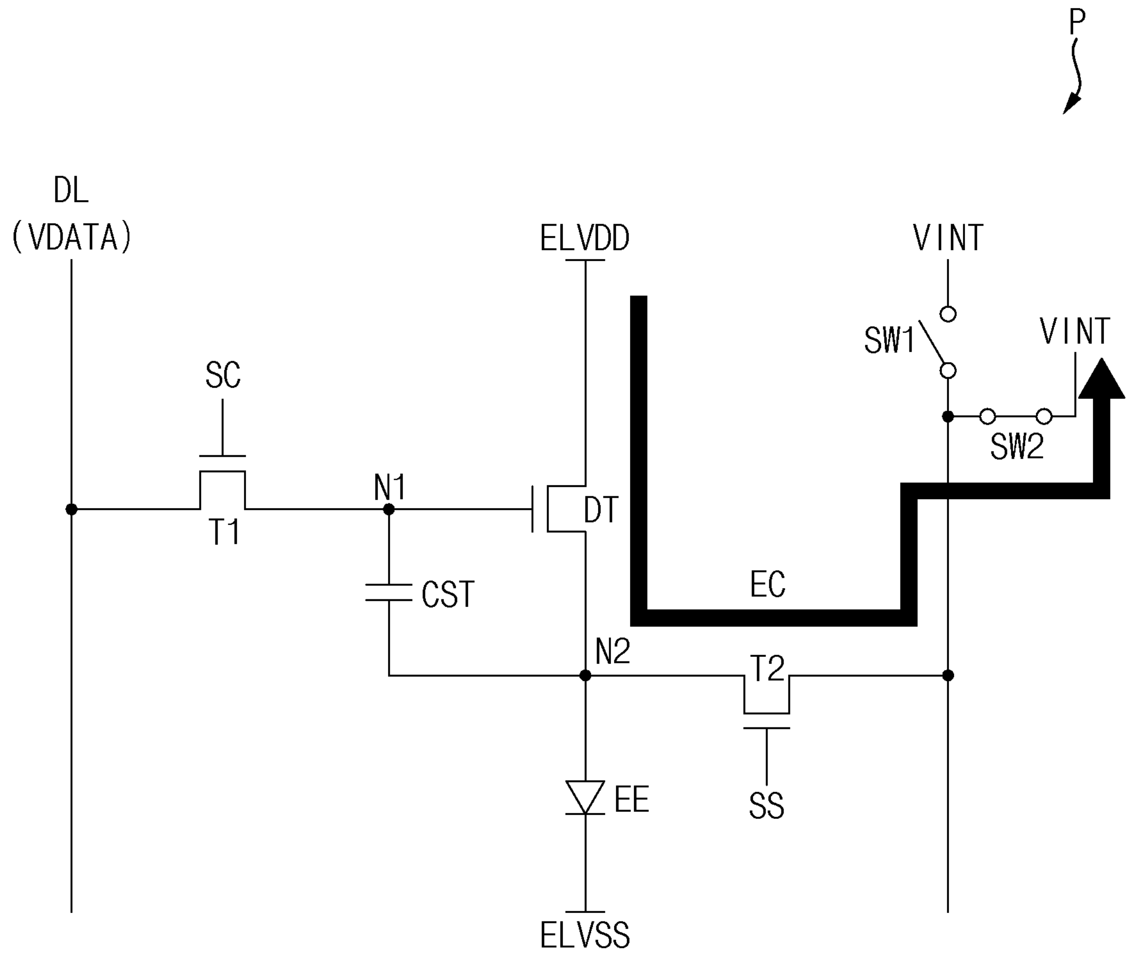
FIG. 6 is a schematic circuit diagram showing one example of a power current flowing through the pixel of FIG. 2 in the misconnection detection period, according to an embodiment.
Figure 7:
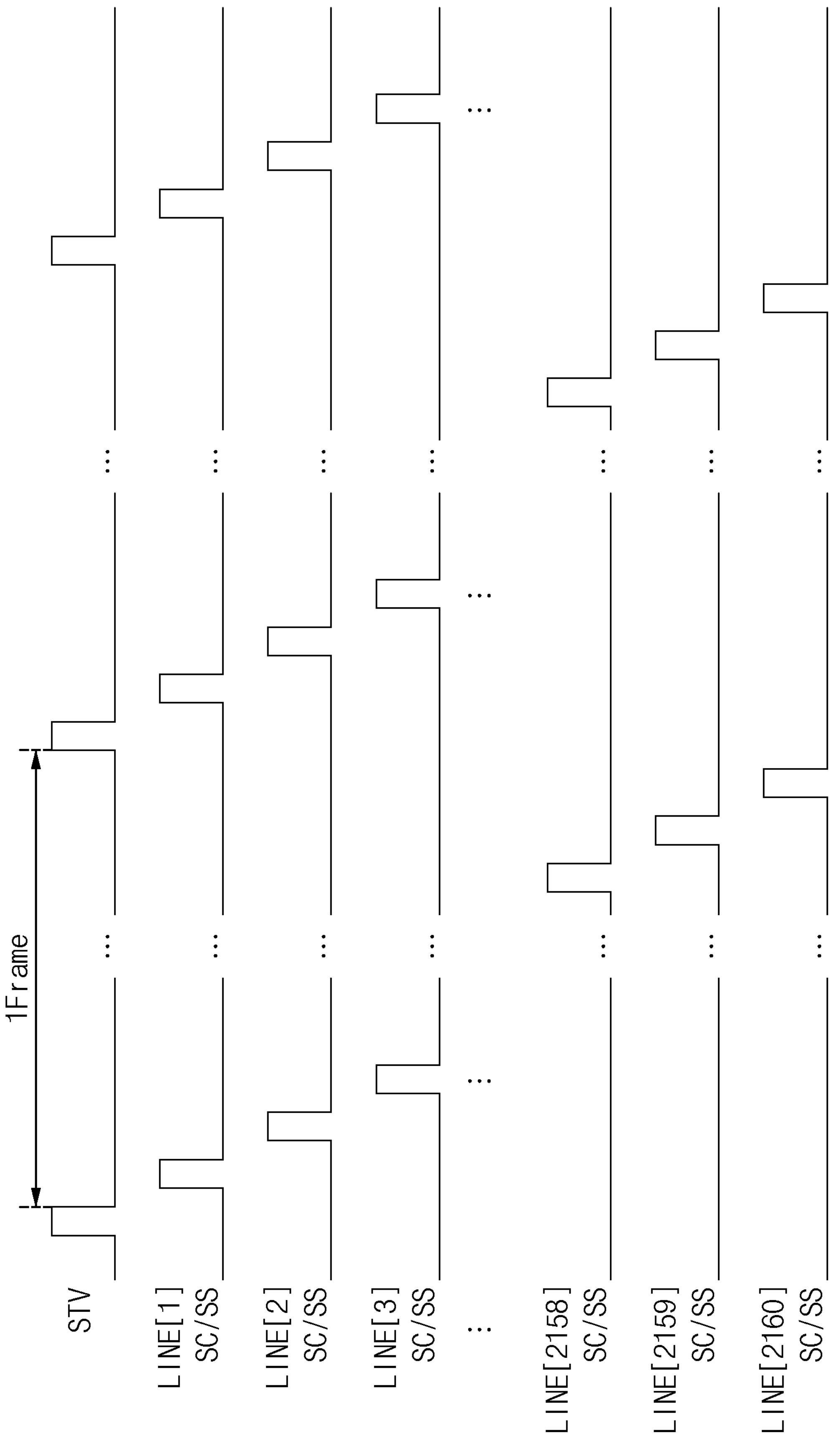
FIG. 7 is a timing diagram showing one example in which the display device of FIG. 1 is driven in a normal driving period, according to an embodiment.
Figure 8:
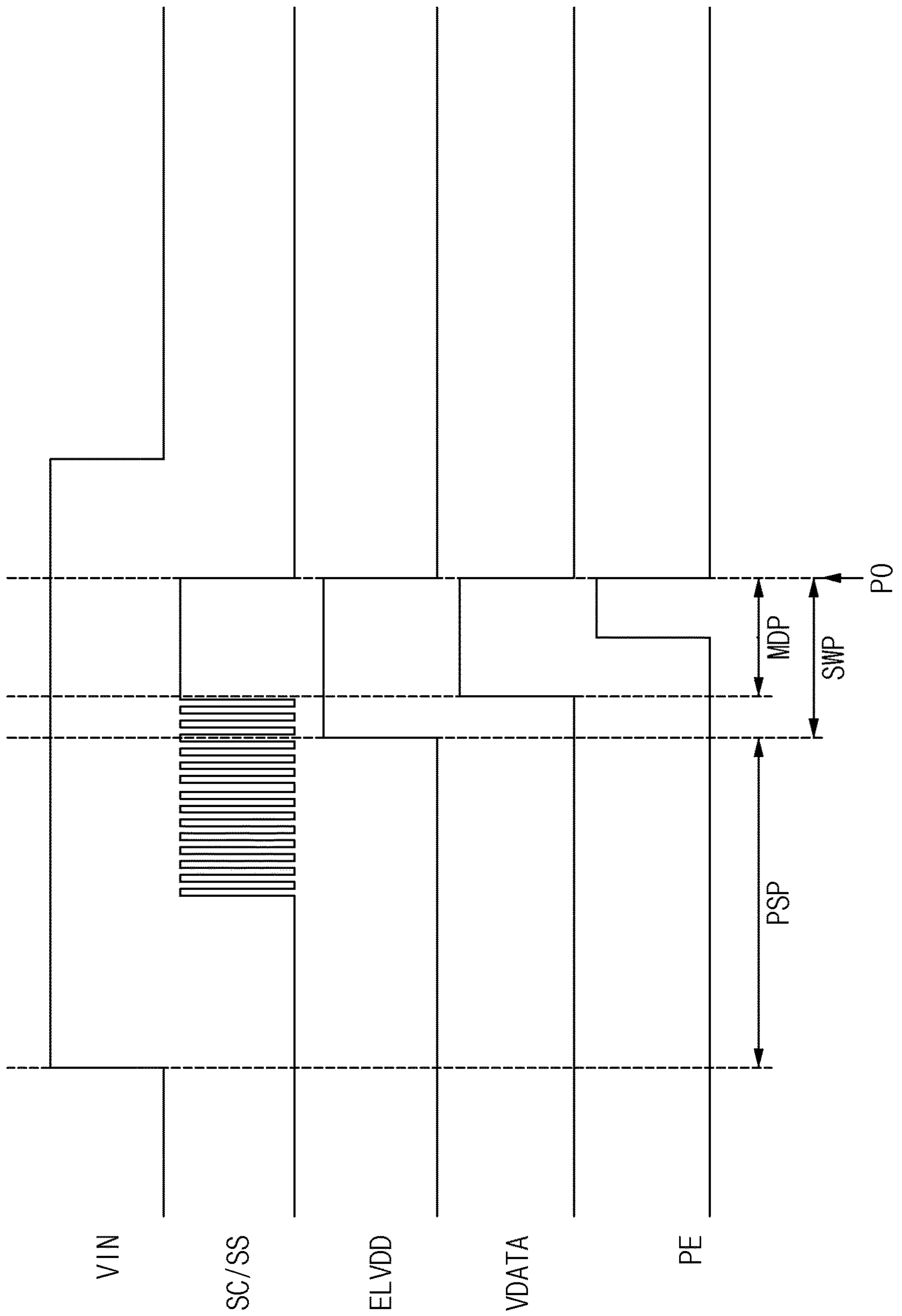
FIG. 8 is a timing diagram showing one example in which the display device of FIG. 1 is driven when the misconnection of the first cable or the second cable is detected, according to an embodiment.

FIG. 4 is a timing diagram showing an embodiment in which the display device of FIG. 1 is driven when misconnection of a first cable FFC1 and/or a second cable FFC2 is not detected, FIG. 5 is a timing diagram showing an embodiment in which the display device of FIG. 1 is driven in a misconnection detection period MDP, FIG. 6 is a circuit diagram showing an embodiment of a power current EC flowing through the pixel P of FIG. 2 in the misconnection detection period MDP, FIG. 7 is a timing diagram showing an embodiment in which the display device of FIG. 1 is driven in a normal driving period NDP, and FIG. 8 is a timing diagram showing an embodiment in which the display device of FIG. 1 is driven when the misconnection of the first cable FFC1 and/or the second cable FFC2 is detected.

In an embodiment and referring to FIGS. 4 and 8, the first gate signal SC and the second gate signal SS have been shown to be the same in order to distinguish between simultaneous scanning and sequential scanning. However, the first gate signal SC and the second gate signal SS do not necessarily have to be the same. For example, the first gate signal SC and the second gate signal SS may be different from each other in a sensing period SP. The above configuration will be described in detail below.

According to an embodiment, FIGS. 4 and 8 show the sequential scanning by repeating pulses having relatively small widths and FIGS. 4 and 8 show the simultaneous scanning with pulses having relatively wide widths as compared with the sequential scanning. For example, FIGS. 4 and 8 show the sequential scanning in a portion of a power stabilization period PSP, a sensing waiting period SWP except for a misconnection detection period MDP, a sensing period SP, and a normal driving period NDP, and show the simultaneous scanning in the misconnection detection period MDP. The sequential scanning and the simultaneous scanning will be described in detail below.

In an embodiment and referring to FIGS. 1 and 4, when the display device is powered on, an input voltage VIN may be applied to the display device from an outside source. The input voltage VIN may be a voltage that is a basis for generating a driving voltage for driving a component of the display device (e.g., at least one of the timing controller 210, the gate driver 300, the data driver 400, and the power voltage generator 500).

In an embodiment, in the power stabilization period PSP, the power voltage generator 500 may not output the first power voltage ELVDD to the display panel 100. The power stabilization period PSP may be a period in which the pixels P do not emit lights to stabilize the display device, which is immediately after the display device is powered on.

In an embodiment, the misconnection detection period MDP may follow the power stabilization period PSP, and may precede the sensing period SP. For example, the misconnection detection period MDP may follow the power stabilization period PSP, and may be included in the sensing waiting period SWP preceding the sensing period SP. For example, the sensing waiting period SWP may be a period between the power stabilization period PSP and the sensing period SP.

In an embodiment, in the sensing waiting period SWP, the power voltage generator 500 may output the first power voltage ELVDD to the display panel 100. The power voltage generator 500 may output the first power voltage ELVDD to the display panel 100 in advance in order to sense the pixels P in the sensing period SP. According to an embodiment, the power voltage generator 500 may output the second power voltage ELVSS to the display panel 100.

In an embodiment and referring to FIGS. 1 and 3 to 6, in the misconnection detection period MDP, the gate driver 300 may output the first gate signal SC and the second gate signal SS, which have the activation levels, to the pixels P. The data driver 400 may output the data voltages VDATA to the pixels P. The power voltage generator 500 may output the first power voltage ELVDD to the display panel 100.

According to an embodiment, the gate driver 300 may simultaneously output the first gate signal SC and the second gate signal SS, which have the activation levels, to the pixels P in the misconnection detection period MDP. In other words, the gate driver 300 may allow all the pixels P to simultaneously perform the same operation (i.e., the simultaneous scanning).

For example, in an embodiment and as shown in FIG. 5, a start signal STV may be a signal representing the start of a frame. The gate driver 300 may receive a first start signal STV to simultaneously output the first gate signal SC and the second gate signal SS, which have the activation levels, to the pixels P in the misconnection detection period MDP.

For example, in an embodiment, in the misconnection detection period MDP, the first transistor T1 and the second transistor T2 may be turned on, the first switch SW1 may be turned off, and the second switch SW2 may be turned on. Therefore, the power current EC may flow from the power voltage generator 500 to a line to which the initialization voltage VINT is applied through the second node N2. In other words, the power current EC may not flow to the light emitting element EE.

In an embodiment, since the power current EC does not flow to the light emitting element EE, light emission of the pixels P may be minimized in the misconnection detection period MDP. When the pixels P emit lights between the power stabilization period PSP and the sensing period SP, stabilization of the display device may be obstructed. However, since the light emission of the pixels P may be minimized in the misconnection detection period MDP, the display device may include the misconnection detection period MDP between the power stabilization period PSP and the sensing period SP.

In an embodiment and referring to FIGS. 1, 2, and 4, the gate driver 300 may sequentially output the first gate signal SC having the activation level to pixel rows LINE[1], LINE[2], LINE[3], . . . , LINE[2158], LINE[2159], and LINE[2160] including the pixels P in the sensing period SP.

In an embodiment, the gate driver 300 may output the first gate signal SC and the second gate signal SS to allow the pixel rows LINE[1], LINE[2], LINE[3], . . . , LINE[2158], LINE[2159], and LINE[2160] to sequentially perform a sensing operation performed in the sensing period SP. In other words, the gate driver 300 may allow the pixel rows LINE[1], LINE[2], LINE[3], . . . , LINE[2158], LINE [2159], and LINE[2160] to sequentially perform the same operation (i.e., the sequential scanning).

For example, in an embodiment, in a first period of the sensing period SP, the first gate signal SC and the second gate signal SS may have the activation levels. In addition, the first transistor T1, the second transistor T2 and the second switch SW2 may be turned on, and the first switch SW1 may be turned off. Accordingly, the data voltage VDATA for the sensing operation may be written to the storage capacitor CST, and the initialization voltage VINT may be applied to the second node N2.

For example, in an embodiment, in a second period of the sensing period SP following the first period of the sensing period SP, the first gate signal SC may have an inactivation level, and the second gate signal SS may have the activation level. In addition, the second transistor T2 and the first switch SW1 may be turned on, and the first transistor T1 and the second switch SW2 may be turned off. Accordingly, the data driver 400 may receive the sensing signal (i.e., the signal of the second node N2).

In an embodiment, the sensing operation may include a series of operations performed in the first period and the second period.

In an embodiment, although the number of the pixel rows LINE[1], LINE[2], LINE[3], . . . , LINE[2158], LINE [2159], and LINE[2160] has been illustrated in the present embodiment as being 2160, the invention is not limited to the number of the pixel rows LINE[1], LINE[2], LINE[3], . . . , LINE[2158], LINE[2159], and LINE[2160].

In an embodiment and referring to FIGS. 1, 2, 4, and 7, the gate driver 300 may output the first gate signal SC and the second gate signal SS to allow the pixel rows LINE[1], LINE[2], LINE[3], . . . , LINE[2158], LINE[2159], and LINE[2160] to sequentially perform an emission operation performed in the normal driving period NDP. In other words, the gate driver 300 may allow the pixel rows LINE[1], LINE[2], LINE[3], . . . , LINE[2158], LINE[2159], and LINE[2160] to sequentially perform the same operation (i.e., the sequential scanning).

In an embodiment, the normal driving period NDP may include a non-emission period in which the first gate signal SC and the second gate signal SS have the activation levels and an emission period in which the first gate signal SC and the second gate signal SS have inactivation levels.

For example, in an embodiment, in the non-emission period, the data voltage VDATA may be written to the storage capacitor CST, and the initialization voltage VINT may be applied to the second node N2. In the emission period, the power current EC may flow to the light emitting element EE, and the light emitting element EE may emit a light with a luminance corresponding to the power current EC.

In an embodiment, the emission operation may include a series of operations performed in the non-emission period and the emission period.

In an embodiment and referring to FIGS. 1, 3, and 8, the timing controller 210 may perform a protection operation PO by detecting the misconnection of the first cable FFC1 and/or the second cable FFC2 based on the first power voltage ELVDD in the misconnection detection period MDP.

For example, in an embodiment, the timing controller 210 may generate a protection enable signal PE having an activation level when the misconnection of the first cable FFC1 and/or the second cable FFC2 is detected. The timing controller 210 may perform the protection operation PO in response to the protection enable signal PE.

The generation of the protection enable signal PE will be described in detail below.

In an embodiment, the data driver 400 may not output the data voltages VDATA when the protection operation PO is performed, the gate driver 300 may not output the first gate signal SC and the second gate signal SS when the protection operation PO is performed, and the power voltage generator 500 may not output the first power voltage ELVDD when the protection operation PO is performed. In other words, when the protection operation PO is performed, all operations of the display device may be stopped, and a user may reconnect the misconnected cables FFC1 and FFC2.

Figure 9:
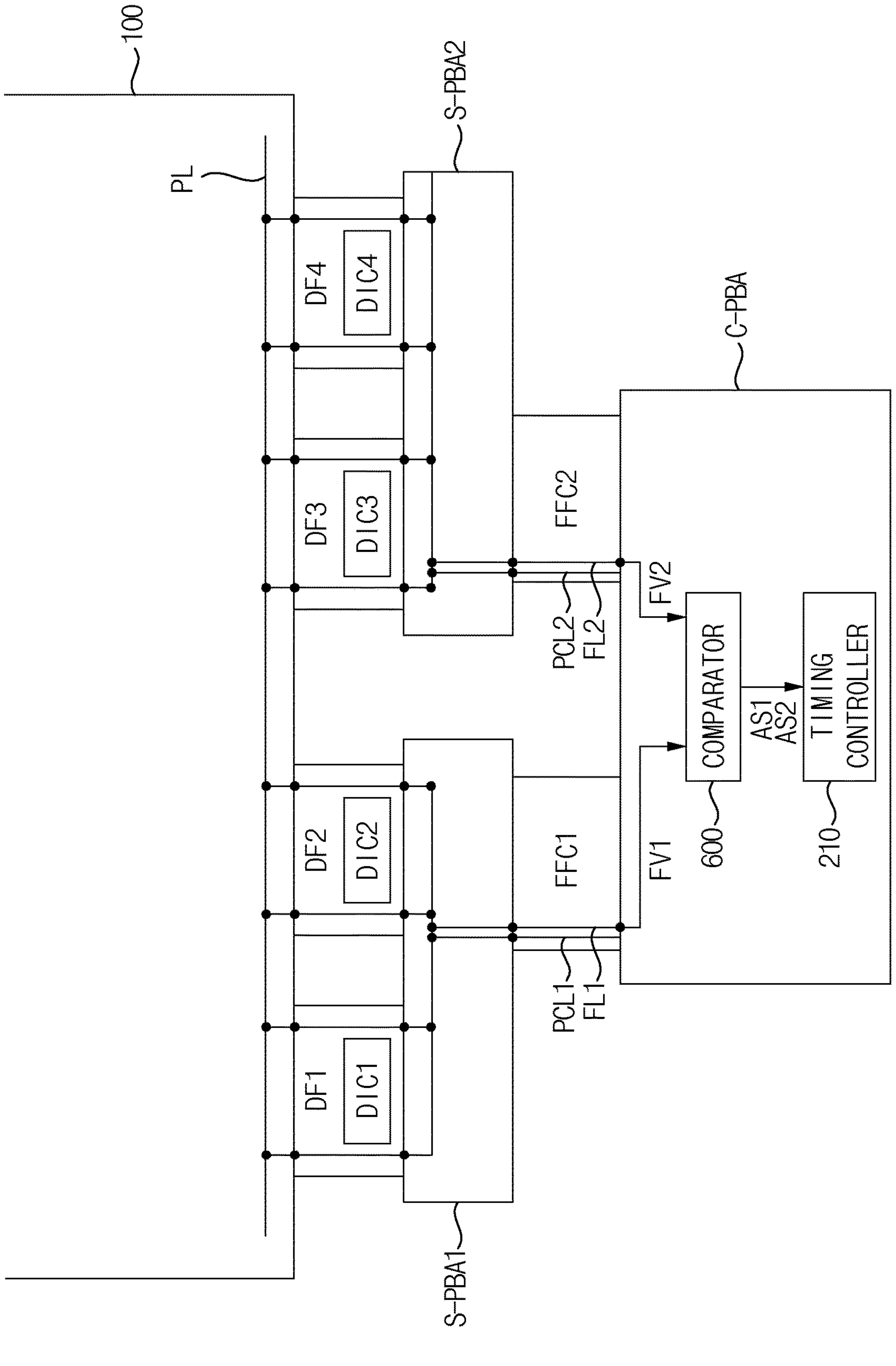
FIG. 9 is a block diagram showing one example in which the display device of FIG. 1 feeds back a first power voltage, according to an embodiment.
Figure 10:
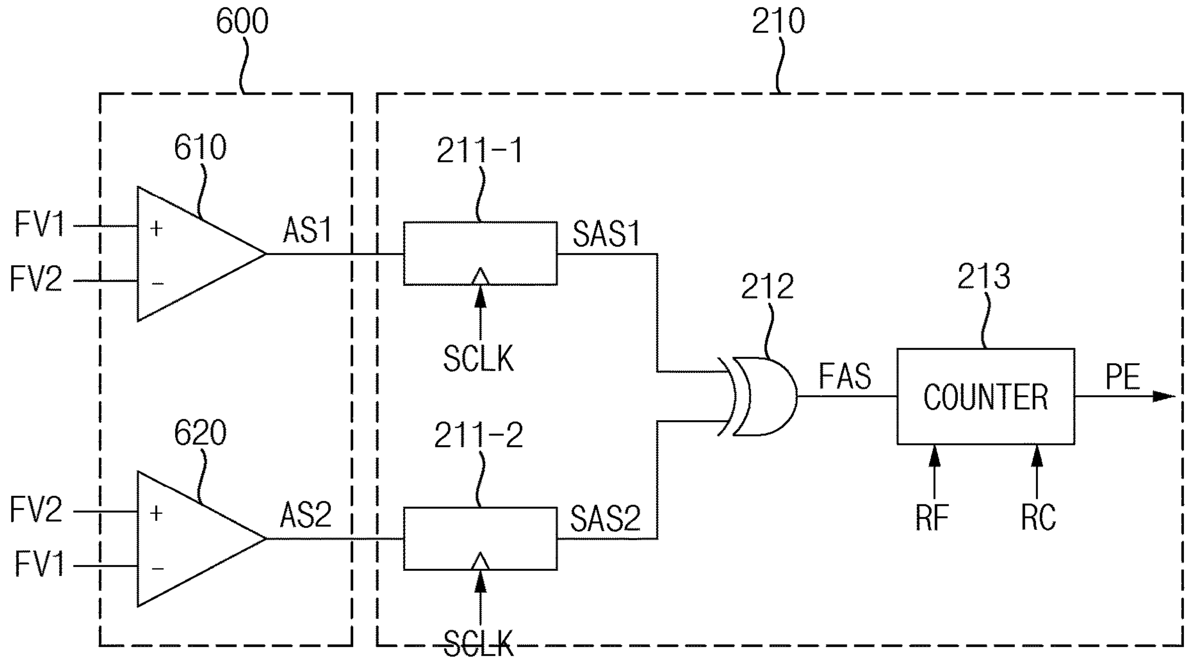
FIG. 10 is a schematic circuit diagram showing one example of a comparator and a timing controller of the display device of FIG. 1, according to an embodiment.
Figure 11:
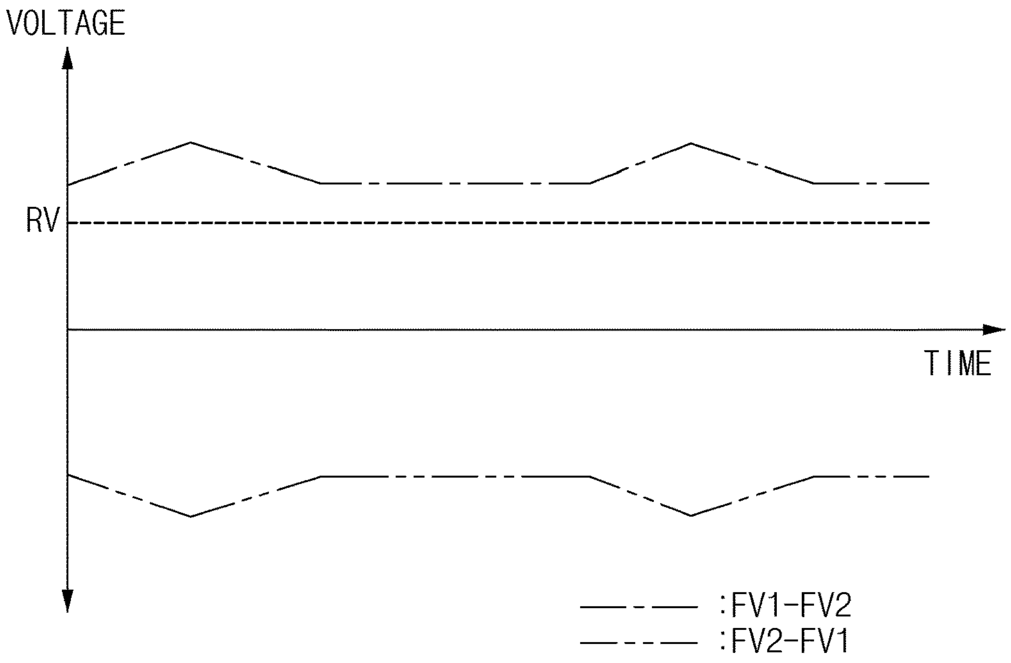
FIG. 11 is a graph showing a case in which the second cable is misconnected, according to an embodiment.
Figure 12:
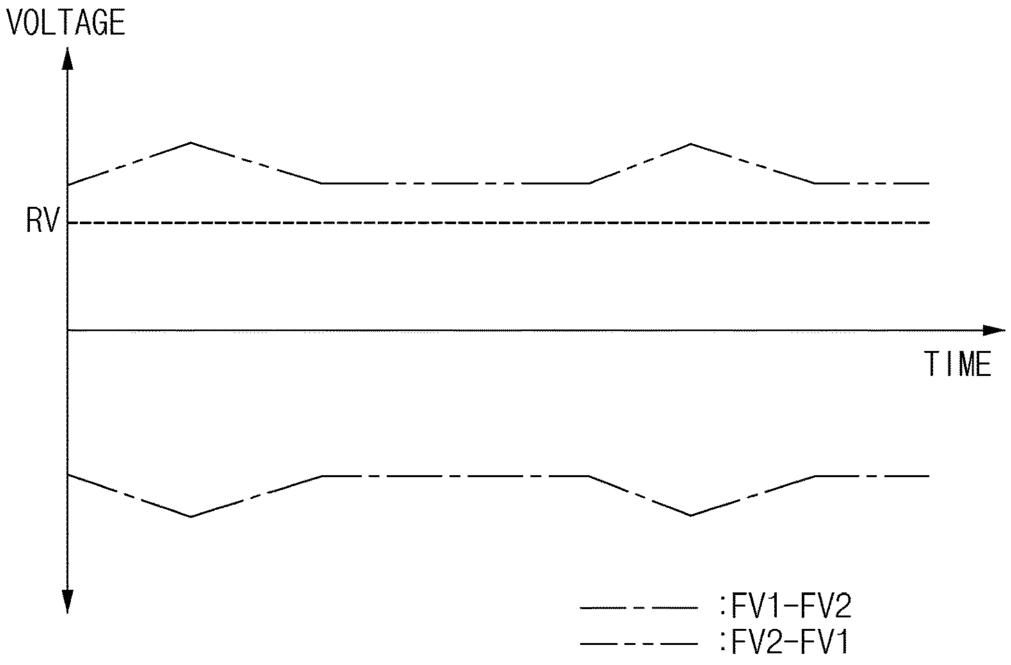
FIG. 12 is a graph showing a case in which the first cable is misconnected, according to an embodiment.

FIG. 9 is a block diagram showing an embodiment in which the display device of FIG. 1 feeds back a first power voltage ELVDD, FIG. 10 is a block diagram showing an embodiment of a comparator 600 and a timing controller 210 of the display device of FIG. 1, FIG. 11 is a graph showing an embodiment in which the second cable FFC2 is misconnected, and FIG. 12 is a graph showing an embodiment in which the first cable FFC1 is misconnected.

FIG. 9 does not show the power voltage generator 500 for convenience of description.

In an embodiment and referring to FIGS. 1 and 9 to 12, the timing controller 210 may detect the misconnection of the first cable FFC1 and/or the second cable FFC2 based on a first feedback voltage FV1 generated by feeding back the first power voltage ELVDD in the first source printed circuit board S-PBA1 and a second feedback voltage FV2 generated by feeding back the first power voltage ELVDD in the second source printed circuit board S-PBA2.

According to an embodiment, the comparator 600 may include a first comparator 610 configured to generate a first alert signal AS1 having a high voltage level when the first feedback voltage FV1 is greater than or equal to the second feedback voltage FV2 by a reference voltage RV and a second comparator 620 configured to generate a second alert signal AS2 having the high voltage level when the second feedback voltage FV2 is greater than or equal to the first feedback voltage FV1 by the reference voltage RV. The reference voltage RV may be a preset value.

For example, in an embodiment, the first cable FFC1 may include a first feedback line FL1 to which the first feedback voltage FV1 is applied. The second cable FFC2 may include a second feedback line FL2 to which the second feedback voltage FV2 is applied. The first feedback line FL1 may be connected to a line of the first source printed circuit board S-PBA1 connected to the first power cable line PCL1. The first comparator 610 may receive the first feedback voltage FV1 through the first feedback line FL1. The second feedback line FL2 may be connected to a line of the second source printed circuit board S-PBA2 connected to the second power cable line PCL2. The second comparator 620 may receive the second feedback voltage FV2 through the second feedback line FL2.

In an embodiment and as shown in FIG. 11, when the second cable FFC2 is misconnected, a contact resistance of the second cable FFC2 may be increased, so that the power current flowing through the second cable FFC2 may be reduced, and the power current flowing through the first cable FFC1 may be increased. Accordingly, the first power voltage ELVDD in the first source printed circuit board S-PBA1 (i.e., the first feedback voltage FV1) may be greater than the first power voltage ELVDD in the second source printed circuit board S-PBA2 (i.e., the second feedback voltage FV2). Therefore, the first alert signal AS1 having the high voltage level may represent the misconnection of the second cable FFC2.

In an embodiment and as shown in FIG. 12, when the first cable FFC1 is misconnected, a contact resistance of the first cable FFC1 may be increased, so that the power current flowing through the first cable FFC1 may be reduced, and the power current flowing through the second cable FFC2 may be increased. Accordingly, the first power voltage ELVDD in the second source printed circuit board S-PBA2 (i.e., the second feedback voltage FV2) may be greater than the first power voltage ELVDD in the first source printed circuit board S-PBA1 (i.e., the first feedback voltage FV1). Therefore, the second alert signal AS2 having the high voltage level may represent the misconnection of the first cable FFC1.

In an embodiment, the timing controller 210 may generate a first sampling alert signal SAS1 by sampling the first alert signal AS1, generate a second sampling alert signal SAS2 by sampling the second alert signal AS2, output a final alert signal FAS according to XOR logic based on the first sampling alert signal SAS1 and the second sampling alert signal SAS2, and perform the protection operation based on the final alert signal FAS.

In an embodiment, the timing controller 210 may include a first sampler 211-1 configured to sample the first alert signal AS1 and a second sampler 211-2 configured to sample the second alert signal AS2. The first sampler 211-1 may receive a sampling clock signal SCLK and sample the first alert signal AS1 in synchronization with the sampling clock signal SCLK. The second sampler 211-2 may receive the sampling clock signal SCLK and sample the second alert signal AS2 in synchronization with the sampling clock signal SCLK.

In an embodiment, the timing controller 210 may include an XOR logic circuit 212. The XOR logic circuit 212 may output the final alert signal FAS according to the XOR logic. For example, when one of the first alert signal AS1 and the second alert signal AS2 has the high voltage level, the XOR logic circuit 212 may output the final alert signal FAS having the high voltage level.

In an embodiment, the timing controller 210 may generate a count value by counting the final alert signal FAS having the high voltage level during a reference number of frames RF, and perform the protection operation when the count value is greater than a reference count value RC. The reference number of frames RF and the reference count value RC may be preset values.

In an embodiment, the timing controller 210 may include a counter 213 configured to count the final alert signal FAS. The counter 213 may generate the protection enable signal PE having an activation level based on the final alert signal FAS.

For example, in an embodiment where the reference number of frames RF is 100, and the reference count value RC is 50, the counter 213 may receive the final alert signal FAS during 100 frames, and may generate the protection enable signal PE having the activation level when the final alert signal FAS having the high voltage level is input 50 or more times during the 100 frames.

Therefore, in an embodiment, when the first cable FFC1 and/or the second cable FFC2 is misconnected, the timing controller 210 may perform the protection operation in response to the protection enable signal PE having the activation level.

Figure 13:
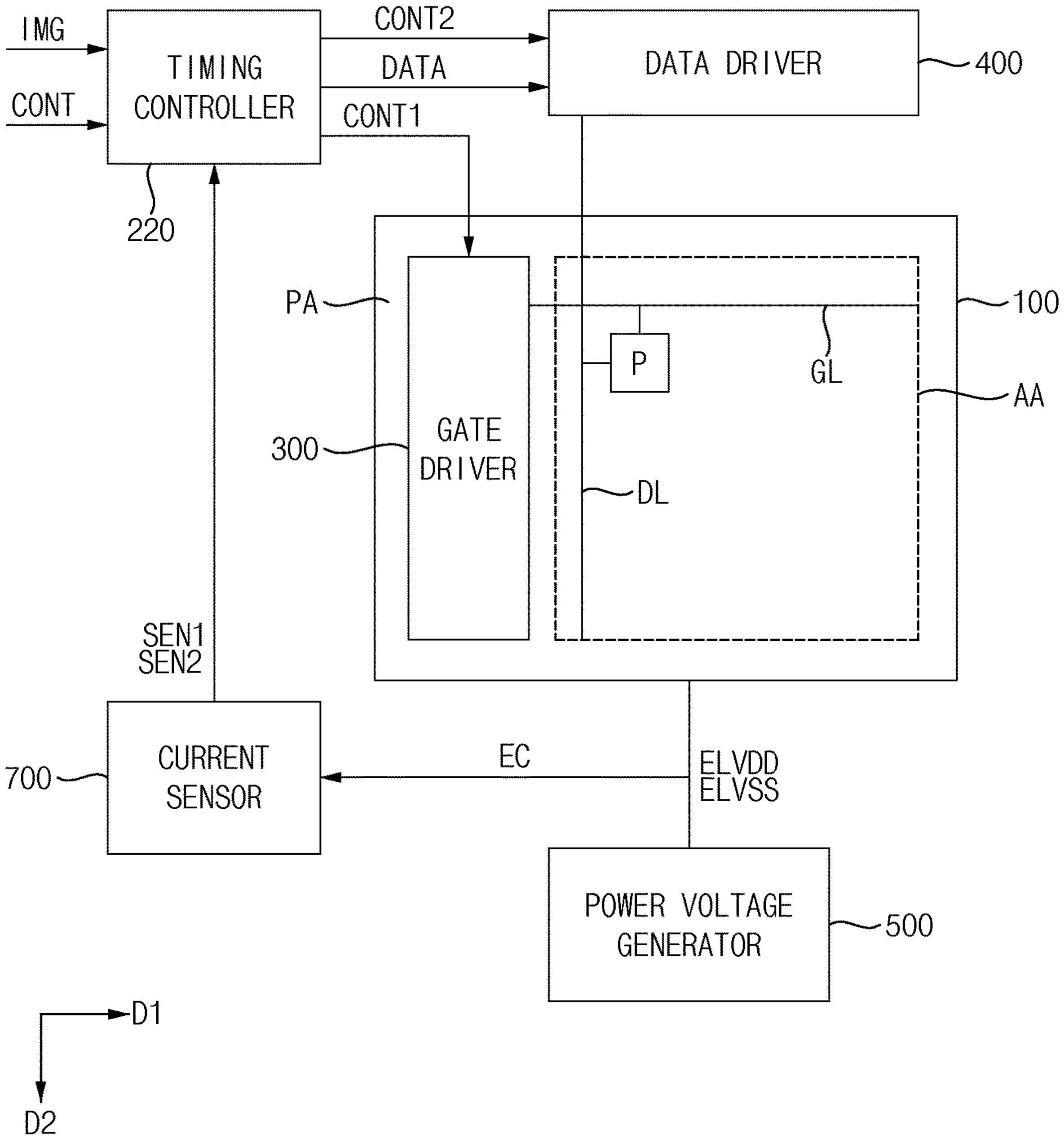
FIG. 13 is a schematic block diagram showing a display device, according to an embodiment.
Figure 14:
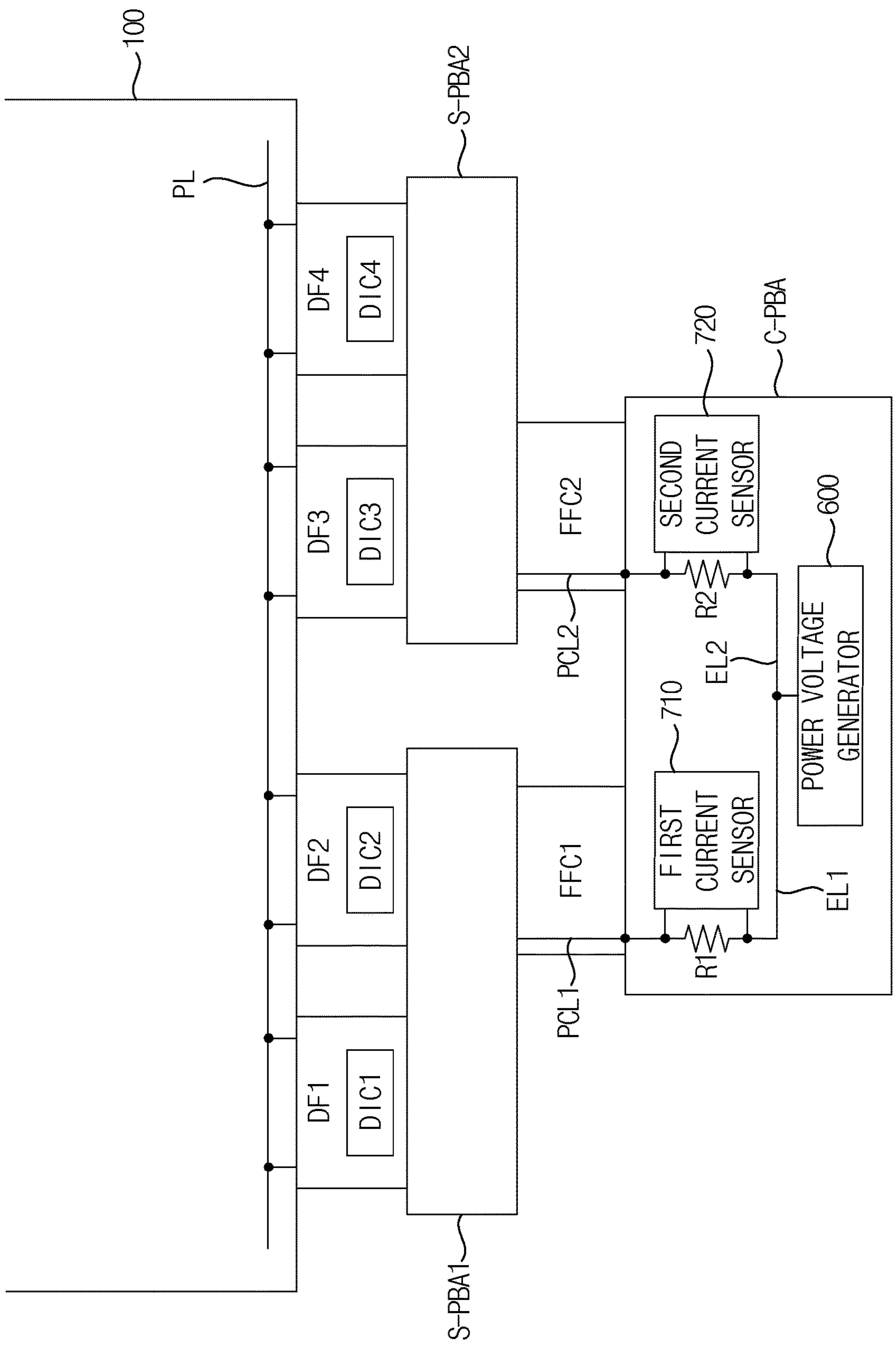
FIG. 14 is a block diagram showing one example in which the display device of FIG. 13 senses a power current, according to an embodiment.
Figure 15:
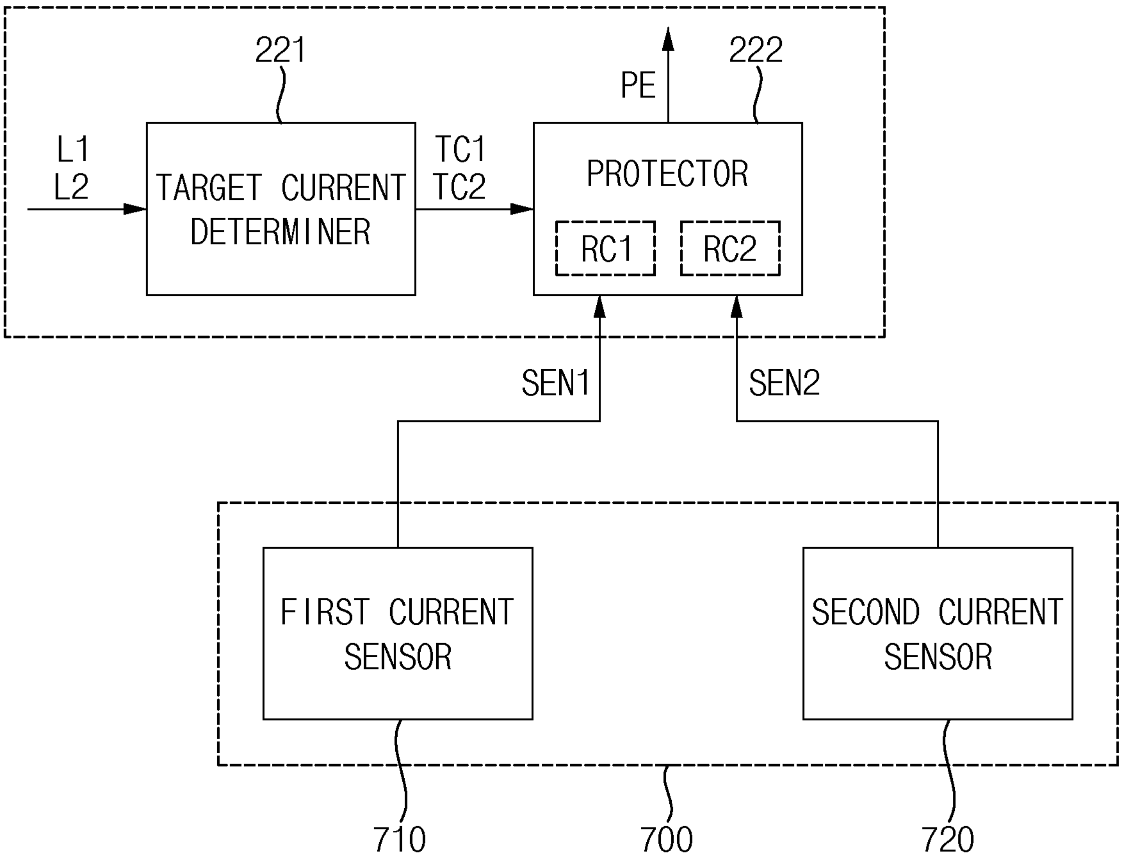
FIG. 15 is a block diagram showing one example of a current sensor and a timing controller of the display device of FIG. 13, according to an embodiment.
Figure 16:
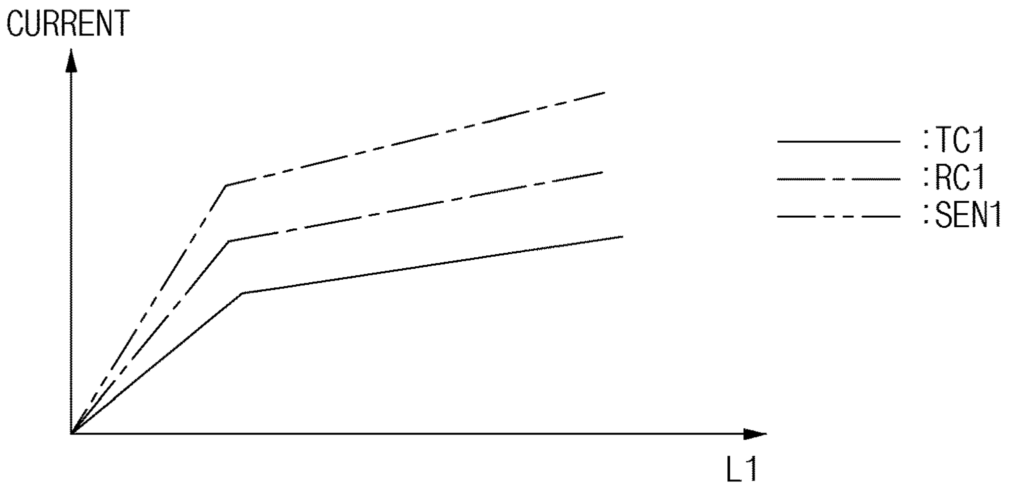
FIG. 16 is a graph showing a case in which a second cable is misconnected, according to an embodiment.
Figure 17:
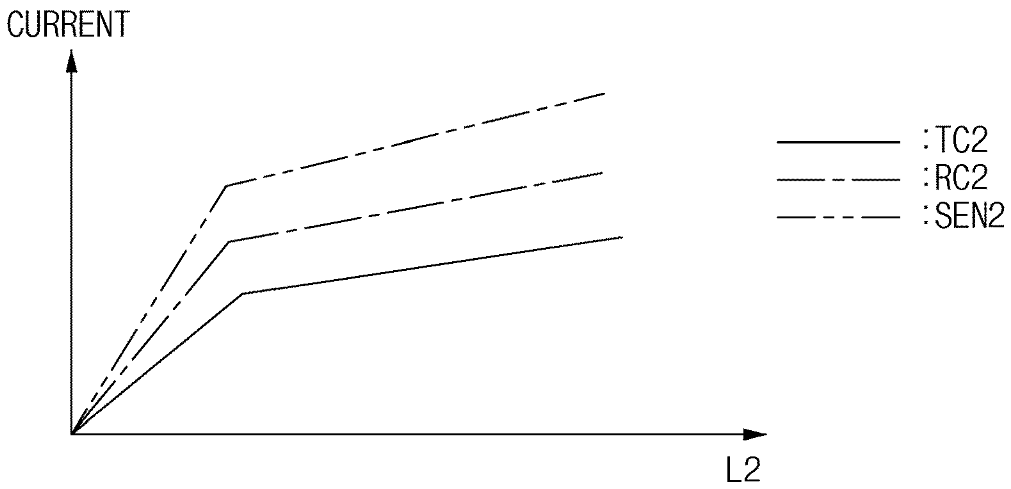
FIG. 17 is a graph showing a case in which a first cable is misconnected, according to an embodiment.

FIG. 13 is a block diagram showing a display device according to an embodiment, FIG. 14 is a block diagram showing an embodiment in which the display device of FIG. 13 senses a power current, FIG. 15 is a block diagram showing an embodiment of a current sensor 700 and a timing controller 220 of the display device of FIG. 13, FIG. 16 is a graph showing an embodiment in which a second cable FFC2 is misconnected, and FIG. 17 is a graph showing an embodiment in which a first cable FFC1 is misconnected.

Since a display device according to an embodiment has a configuration that is substantially identical to the configuration of the display device of FIG. 1 except for the generation of the protection enable signal PE having the activation level, the same reference numerals and reference signs will be used for the same or similar components, and redundant descriptions will be omitted.

In an embodiment and referring to FIGS. 4 and 13 to 17, the timing controller 220 may perform a protection operation by detecting misconnection of a first cable FFC1 and/or a second cable FFC2 based on power currents of power lines EL1 and EL2 to which the first power voltage ELVDD is applied.

In an embodiment, the display device may include a current sensor 700 configured to sense the power currents of the power lines EL1 and EL2 to which the first power voltage ELVDD is applied.

According to an embodiment, the current sensor 700 may include a first current sensor 710 configured to generate a first sensing current SEN1 by sensing the power current output to the first cable FFC1 in the misconnection detection period MDP and a second current sensor 720 configured to generate a second sensing current SEN2 by sensing the power current output to the second cable FFC2 in the misconnection detection period MDP.

For example, in an embodiment, the first current sensor 710 may be connected to a first power line EL1 through which the first power voltage ELVDD applied to the display panel 100 is output through the first cable FFC1. The first current sensor 710 may measure a voltage between both ends of a first resistance element R1 connected to the first power line EL1. The first current sensor 710 may generate the first sensing current SEN1 by using Ohm's law.

For example, in an embodiment, the second current sensor 720 may be connected to a second power line EL2 through which the first power voltage ELVDD applied to the display panel 100 is output through the second cable FFC2. The second current sensor 720 may measure a voltage between both ends of a second resistance element R2 connected to the second power line EL2. The second current sensor 720 may generate the second sensing current SEN2 by using Ohm's law.

In an embodiment, the timing controller 220 may detect the misconnection of the first cable FFC1 and the second cable FFC2 based on a first load L1 of a first display region in the misconnection detection period MDP and/or a second load L2 of a second display region in the misconnection detection period MDP.

In an embodiment, the loads L1 and L2 may be normalized to have values from about 0% to about 100%. For example, when the display device displays a full-white image in the first display region, the first load L1 may be about 100%. For example, when the display device displays a full-black image in the first display region, the first load L1 may be about 0%. For example, when the display device displays a full-white image in the second display region, the second load L2 may be about 100%. For example, when the display device displays a full-black image in the second display region, the second load L2 may be about 0%.

In an embodiment, the data voltages VDATA applied in the misconnection detection period MDP may be preset. Therefore, the first load L1 and the second load L2 may be determined according to the preset data voltages VDATA in the misconnection detection period MDP.

In an embodiment, the timing controller 220 may determine a first target current TC1 corresponding to the first load L1, determine a first reference current RC1 corresponding to the first target current TC1, and perform the protection operation when the first sensing current SEN1 is greater than the first reference current RC1 and determine a second target current TC2 corresponding to the second load L2, determine a second reference current RC2 corresponding to the second target current TC2, and perform the protection operation when the second sensing current SEN2 is greater than the second reference current RC2.

In an embodiment, the timing controller 220 may include a target current determiner 221 and a protector 222.

In an embodiment, the target current determiner 221 may determine the first target current TC1 corresponding to the first load L1. The first target current TC1 may be a power current flowing through the first power line EL1 to display an image corresponding to the first load L1 in the first display region. For example, the first target current TC1 according to the first load L1 may be stored in the form of a lookup table, and the target current determiner 221 may determine the first target current TC1 by using the lookup table.

In an embodiment, the target current determiner 221 may determine the second target current TC2 corresponding to the second load L2. The second target current TC2 may be a power current flowing through the second power line EL2 to display an image corresponding to the second load L2 in the second display region. For example, the second target current TC2 according to the second load L2 may be stored in the form of a lookup table, and the target current determiner 221 may determine the second target current TC2 by using the lookup table.

In an embodiment, the protector 222 may determine the first reference current RC1 corresponding to the first target current TC1. The first reference current RC1 may be greater than the first target current TC1. For example, the first reference current RC1 according to the first target current TC1 may be stored in the form of a lookup table, and the protector 222 may determine the first reference current RC1 by using the lookup table.

In an embodiment, the protector 222 may determine the second reference current RC2 corresponding to the second target current TC2. The second reference current RC2 may be greater than the second target current TC2. For example, the second reference current RC2 according to the second target current TC2 may be stored in the form of a lookup table, and the protector 222 may determine the second reference current RC2 by using the lookup table.

In an embodiment, the protector 222 may generate a protection enable signal PE having an activation level when the first sensing current SEN1 is greater than the first reference current RC1. As shown in FIG. 16, when the second cable FFC2 is misconnected, a contact resistance of the second cable FFC2 may be increased, so that the power current flowing through the second cable FFC2 may be reduced, and the power current flowing through the first cable FFC1 may be increased. Accordingly, the power current flowing through the first power line EL1 may be increased. In other words, the first sensing current SEN1 may be increased. Therefore, the timing controller 220 may perform the protection operation by determining that the second cable FFC2 is misconnected when the first sensing current SEN1 is greater than the first reference current RC1.

In an embodiment, the protector 222 may generate the protection enable signal PE having the activation level when the second sensing current SEN2 is greater than the second reference current RC2. As shown in FIG. 17, when the first cable FFC1 is misconnected, a contact resistance of the first cable FFC1 may be increased, so that the power current flowing through the first cable FFC1 may be reduced, and the power current flowing through the second cable FFC2 may be increased. Accordingly, the power current flowing through the second power line EL2 may be increased. In other words, the second sensing current SEN2 may be increased. Therefore, the timing controller 220 may perform the protection operation by determining that the first cable FFC1 is misconnected when the second sensing current SEN2 is greater than the second reference current RC2.

Therefore, in an embodiment the timing controller 220 may perform the protection operation in response to the protection enable signal PE having the activation level when the first cable FFC1 and/or the second cable FFC2 is misconnected.

In an embodiment, although a method for detecting the misconnection of the first cable FFC1 and the second cable FFC2 has been illustrated in the present embodiment with reference to FIGS. 9 to 12 and 14 to 17, the invention is not limited to the method for detecting the misconnection of the first cable FFC1 and the second cable FFC2.

Figure 18:
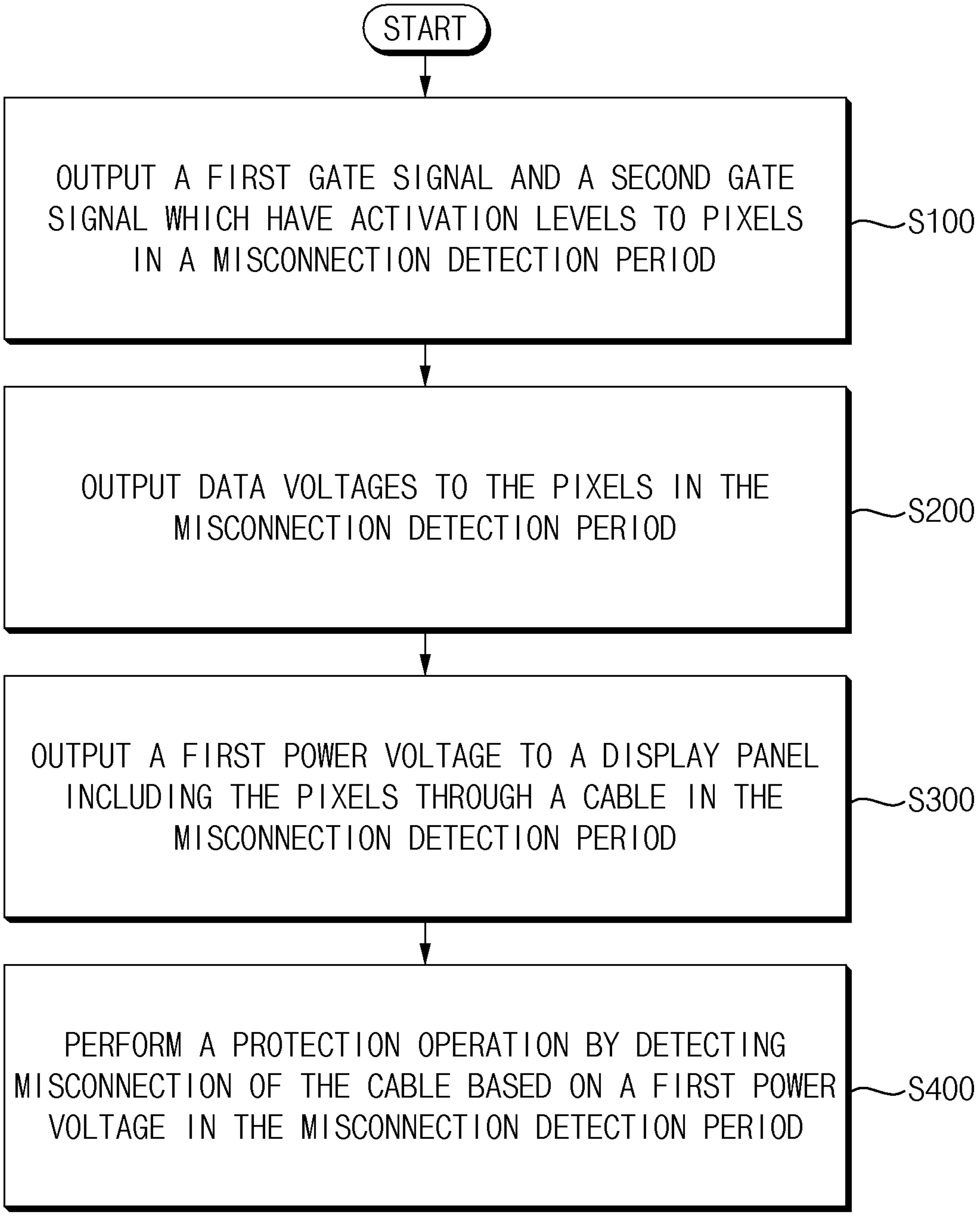
FIG. 18 is a flowchart showing a method for inspecting a display device, according to an embodiment.

FIG. 18 is a flowchart showing a method for inspecting a display device according to an embodiment.

In an embodiment and referring to FIG. 18, a method for inspecting a display device may include outputting a first gate signal for writing data voltages to pixels and a second gate signal for applying an initialization voltage to the pixels, which have activation levels, in a misconnection detection period (S100), outputting the data voltages to the pixels in the misconnection detection period (S200), outputting a first power voltage to a display panel including the pixels through a cable in the misconnection detection period (S300) and performing a protection operation by detecting misconnection of the cable based on the first power voltage in the misconnection detection period (S400). However, since the above configuration has been described with reference to FIGS. 1 to 17, redundant description thereof will be omitted.

Figure 19:
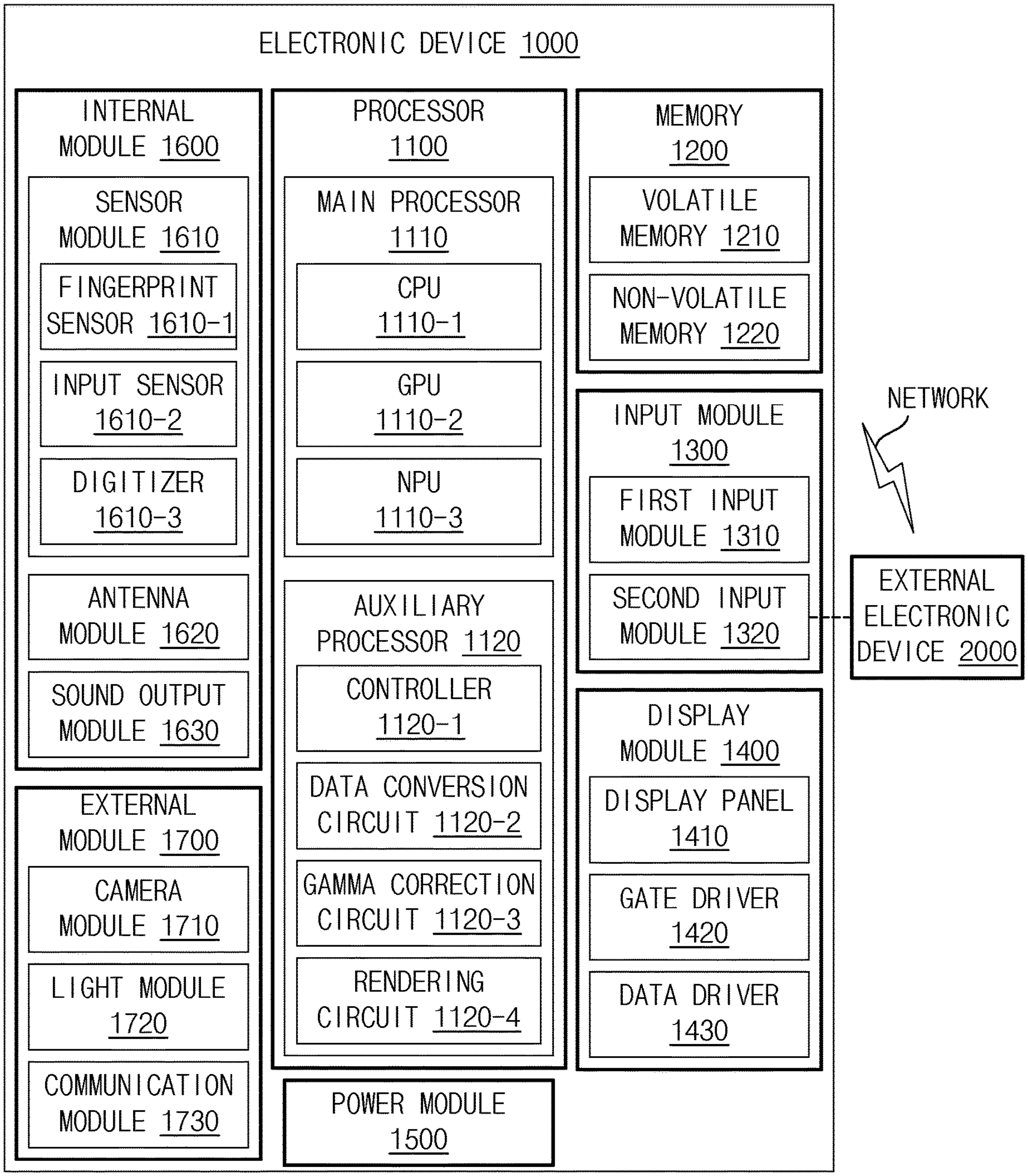
FIG. 19 is a block diagram showing an electronic device, according to an embodiment.
Figure 20:
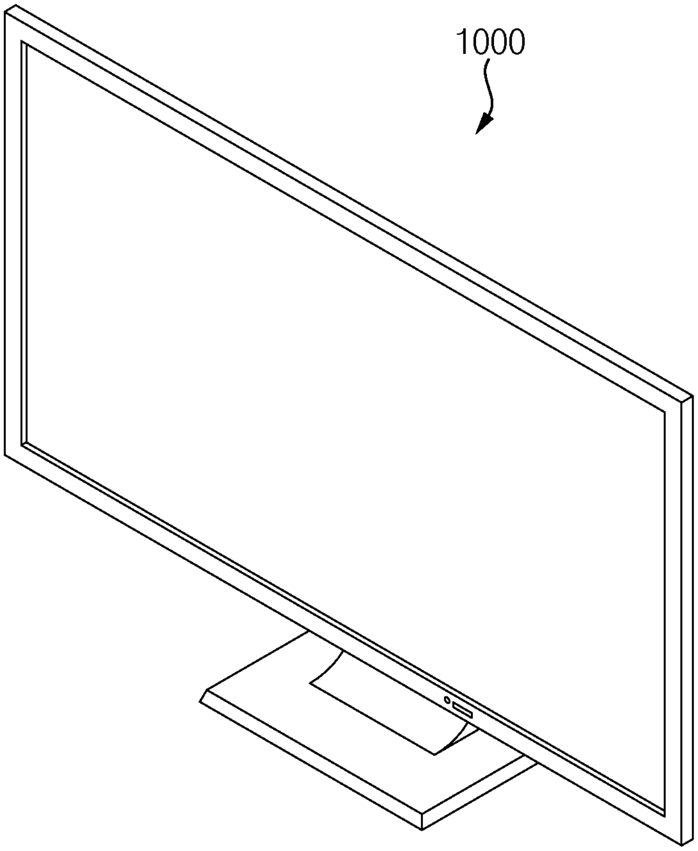
FIG. 20 is a perspective view showing one example in which the electronic device of FIG. 19 is implemented as a television, according to an embodiment.

FIG. 19 is a block diagram showing an electronic device 1000 according to an embodiment, and FIG. 20 is a perspective view showing one embodiment in which the electronic device 1000 of FIG. 19 is implemented as a television.

In an embodiment and referring to FIGS. 19 and 20, an electronic device 1000 may output various information through a display module 1400 within an operating system. When a processor 1100 executes an application stored in a memory 1200, the display module 1400 may provide application information to a user through a display panel 1410. In this case, the display panel 1410 may be the display panel of FIGS. 1 and 13.

In an embodiment, the processor 1100 may obtain an external input through an input module 1300 and/or a sensor module 1610, and execute an application corresponding to the external input. For example, when the user selects a camera icon displayed on the display panel 1410, the processor 1100 may obtain a user input through an input sensor 1610-2, and activate a camera module 1710. The processor 1100 may transmit a data signal corresponding to a captured image obtained through the camera module 1710 to the display module 1400. The display module 1400 may display an image corresponding to the captured image through the display panel 1410.

As another example, in an embodiment, when personal information authentication is executed in the display module 1400, a fingerprint sensor 1610-1 may obtain fingerprint information, which is input, as input data. The processor 1100 may compare the input data obtained through the fingerprint sensor 1610-1 with authentication data stored in the memory 1200, and execute an application according to a comparison result. The display module 1400 may display information executed according to logic of the application through the display panel 1410.

As still another example, in an embodiment, when a music-streaming icon displayed on the display module 1400 is selected, the processor 1100 may obtain the user input through the input sensor 1610-2, and activate a music streaming application stored in the memory 1200. When a music execution command is input in the music streaming application, the processor 1100 may activate a sound output module 1630 to provide sound information corresponding to the music execution command to the user.

In an embodiment, an operation of the electronic device 1000 has been briefly described above. Hereinafter, a configuration of the electronic device 1000 will be described in detail. Some of components of the electronic device 1000 that will be described below may be integrated with each other as one component, and one component may be separated into two or more components.

In an embodiment, the electronic device 1000 may communicate with an external electronic device 2000 through a network (e.g., a short-range wireless communication network and/or a long-range wireless communication network). According to an embodiment, the electronic device 1000 may include a processor 1100, a memory 1200, an input module 1300, a display module 1400, a power module 1500, an internal module 1600, and an external module 1700. According to an embodiment, at least one of the components described above may be omitted from the electronic device 1000, and/or one or more other components may be added to the electronic device 1000. According to an embodiment, some of the components described above (e.g., the sensor module 1610, an antenna module 1620, or the sound output module 1630) may be integrated into another component (e.g., the display module 1400).

In an embodiment, the processor 1100 may execute software to control at least one of the other components (e.g., hardware or software components) of the electronic device 1000 connected to the processor 1100, and may perform various data processing and/or calculations. According to an embodiment, the processor 1100 may store a command and/or data received from another component (e.g., the input module 1300, the sensor module 1610, and/or a communication module 1730) in a volatile memory 1210, process the command and/or data stored in the volatile memory 1210, and/or store result data in a non-volatile memory 1220.

In an embodiment, the processor 1100 may include a main processor 1110 and an auxiliary processor 1120. The main processor 1110 may include at least one of a central processing unit (CPU) 1110-1 and/or an application processor (AP). The main processor 1110 may further include at least one of a graphic processing unit (GPU) 1110-2, a communication processor (CP), and an image signal processor (ISP). The main processor 1110 may further include a neural processing unit (NPU) 1110-3. The neural processing unit may be a processor specialized in processing of an artificial intelligence model, and the artificial intelligence model may be generated through machine learning. The artificial intelligence model may include a plurality of artificial neural network layers. An artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of at least two thereof, but is not limited to the examples described above. The artificial intelligence model may additionally or alternatively include a software structure in addition to a hardware structure. At least two of the processing units and processors described above may be implemented as one integrated component (e.g., a single chip), or may be implemented as independent components (e.g., a plurality of chips), respectively.

In an embodiment, the auxiliary processor 1120 may include a controller 1120-1. The controller 1120-1 may include an interface conversion circuit and a timing control circuit. The controller 1120-1 may receive input image data from the main processor 1110, and may convert a data format of the input image data to meet interface specifications with the display module 1400 to output a data signal. The controller 1120-1 may output various control signals required for driving the display module 1400.

In an embodiment, the auxiliary processor 1120 may further include a data conversion circuit 1120-2, a gamma correction circuit 1120-3, a rendering circuit 1120-4, and the like. The data conversion circuit 1120-2 may receive the data signal from the controller 1120-1, and may compensate for the data signal to display an image with a desired luminance according to characteristics of the electronic device 1000, settings of the user, or the like, or convert the data signal for reduction of power consumption, afterimage compensation, or the like. The gamma correction circuit 1120-3 may convert the data signal, a gamma reference voltage, or the like so that an image displayed on the electronic device 1000 may have a desired gamma characteristic. The rendering circuit 1120-4 may receive the data signal from the controller 1120-1, and may render the data signal in consideration of a pixel arrangement and the like of the display panel 1410 applied to the electronic device 1000. At least one of the data conversion circuit 1120-2, the gamma correction circuit 1120-3, and the rendering circuit 1120-4 may be integrated into another component (e.g., the main processor 1110 or the controller 1120-1).

In an embodiment, at least one of the controller 1120-1, the data conversion circuit 1120-2, the gamma correction circuit 1120-3, and the rendering circuit 1120-4 may be integrated into a data driver 1430 that will be described below.

In an embodiment, the auxiliary processor 1120 may be the timing controller of FIGS. 1 and 13.

In an embodiment, the memory 1200 may store various data used by at least one of the components (e.g., the processor 1100 or the sensor module 1610) of the electronic device 1000, and input data and/or output data for a command associated with the stored various data. The memory 1200 may include at least one of the volatile memory 1210 and the non-volatile memory 1220.

In an embodiment, the input module 1300 may receive a command or data to be used for the components (e.g., the processor 1100, the sensor module 1610, or the sound output module 1630) of the electronic device 1000 from an outside of the electronic device 1000 (e.g., the user or the external electronic device 2000).

In an embodiment, the input module 1300 may include a first input module 1310 configured to receive a command or data from the user and a second input module 1320 configured to receive a command or data from the external electronic device 2000. The first input module 1310 may include a microphone, a mouse, a keyboard, a key (e.g., a button), or a pen (e.g., a passive pen or an active pen). The second input module 1320 may support a designated protocol capable of enabling wired or wireless connection with the external electronic device 2000. According to an embodiment, the second input module 1320 may include a high-definition multimedia interface (HDMI), a universal serial bus (USB) interface, an SD card interface, or an audio interface. The second input module 1320 may include a connector capable of enabling physical connection with the external electronic device 2000, for example, an HDMI connector, a USB connector, an SD card connector, or an audio connector (e.g., a headphone connector).

In an embodiment, the display module 1400 may visually provide information to the user. The display module 1400 may include a display panel 1410, a gate driver 1420, and a data driver 1430. The display module 1400 may further include a window, a chassis, and a bracket configured to protect the display panel 1410. In an embodiment, the gate driver 1420 and the data driver 1430 may be the gate driver and data driver of FIGS. 1 and 13, respectively.

In an embodiment, the display panel 1410 may include a liquid crystal display panel, an organic light emitting display panel, or an inorganic light emitting display panel, and a type of display panel 1410 is not particularly limited. The display panel 1410 may be a rigid type or a flexible type that may be rolled or folded. The display module 1400 may further include a supporter, a bracket, a heat dissipation member, or the like configured to support the display panel 1410.

In an embodiment, the gate driver 1420 may be mounted on the display panel 1410 as a driving chip. In addition, the gate driver 1420 may be integrated on the display panel 1410. For example, the gate driver 1420 may include an amorphous silicon TFT gate driver circuit (ASG), a low-temperature polycrystalline silicon (LTPS) TFT gate driver circuit, or an oxide semiconductor TFT gate driver circuit (OSG), which is embedded in the display panel 1410. The gate driver 1420 may receive a control signal from the controller 1120-1, and output gate signals to the display panel 1410 in response to the control signal.

In an embodiment, the display panel 1410 may further include an emission driver. The emission driver may output an emission signal to the display panel 1410 in response to the control signal received from the controller 1120-1. The emission driver may be formed separately from the gate driver 1420, or may be integrated into the gate driver 1420.

In an embodiment, the data driver 1430 may receive the control signal from the controller 1120-1, convert the data signal into an analog voltage (e.g., a data voltage) in response to the control signal, and output data voltages to the display panel 1410.

In an embodiment, the data driver 1430 may be integrated into another component (e.g., the controller 1120-1). The functions of the interface conversion circuit and the timing control circuit of the controller 1120-1 described above may be integrated into the data driver 1430.

In an embodiment, the display module 1400 may further include a light emission driver, a voltage generation circuit, and/or the like. The voltage generation circuit may output various voltages required for driving the display panel 1410.

In an embodiment, the power module 1500 may supply a power to the components of the electronic device 1000. The power module 1500 may include a battery configured to charge a power voltage. The battery may include a primary battery that is non-rechargeable, and a secondary battery or a fuel battery, which is rechargeable. The power module 1500 may include a power management integrated circuit (PMIC). The PMIC may supply an optimized power to each of the modules described above and modules that will be described below. The power module 1500 may include a wireless power transmission/reception member electrically connected to the battery. The wireless power transmission/reception member may include a plurality of antenna radiators having a coil shape.

In an embodiment, the electronic device 1000 may further include an internal module 1600 and an external module 1700. The internal module 1600 may include a sensor module 1610, an antenna module 1620, and a sound output module 1630. The external module 1700 may include a camera module 1710, a light module 1720, and a communication module 1730.

In an embodiment, the sensor module 1610 may sense an input caused by a body of the user or an input caused by the pen among the first input module 1310, and may generate an electrical signal or a data value corresponding to the input. The sensor module 1610 may include at least one of a fingerprint sensor 1610-1, an input sensor 1610-2, and a digitizer 1610-3.

In an embodiment, the fingerprint sensor 1610-1 may generate a data value corresponding to a fingerprint of the user. The fingerprint sensor 1610-1 may include one of optical or capacitive fingerprint sensors.

In an embodiment, the input sensor 1610-2 may generate a data value corresponding to coordinate information of the input caused by the body of the user or the input caused by the pen. The input sensor 1610-2 may generate a capacitance variation caused by the input as the data value. The input sensor 1610-2 may sense an input caused by the passive pen, or may transmit/receive data to/from the active pen.

In an embodiment, the input sensor 1610-2 may measure a bio-signal such as a blood pressure, moisture, or body fat. For example, when the user does not move for a predetermined time while allowing a portion of the body to make contact with a sensor layer or a sensing panel, the input sensor 1610-2 may sense the bio-signal to output information desired by the user to the display module 1400 based on an electric field variation caused by the portion of the body.

In an embodiment, the digitizer 1610-3 may generate a data value corresponding to coordinate information of the input caused by the pen. The digitizer 1610-3 may generate an electromagnetic variation caused by the input as the data value. The digitizer 1610-3 may sense the input caused by the passive pen, or may transmit/receive data to/from the active pen.

In an embodiment, at least one of the fingerprint sensor 1610-1, the input sensor 1610-2, and the digitizer 1610-3 may be implemented as a sensor layer formed on the display panel 1410 through consecutive processes. The fingerprint sensor 1610-1, the input sensor 1610-2, and the digitizer 1610-3 may be disposed on the display panel 1410, and one or more of the fingerprint sensor 1610-1, the input sensor 1610-2, and the digitizer 1610-3, for example, the digitizer 1610-3 may be disposed under the display panel 1410.

In an embodiment, at least two of the fingerprint sensor 1610-1, the input sensor 1610-2, and the digitizer 1610-3 may be integrated into one sensing panel through the same process. When integrated into one sensing panel, the sensing panel may be disposed between the display panel 1410 and the window disposed on the display panel 1410. According to an embodiment, the sensing panel may be disposed on the window, and a location of the sensing panel is not particularly limited.

In an embodiment, at least one of the fingerprint sensor 1610-1, the input sensor 1610-2, and the digitizer 1610-3 may be embedded in the display panel 1410. In other words, at least one of the fingerprint sensor 1610-1, the input sensor 1610-2, and the digitizer 1610-3 may be simultaneously formed through a process of forming elements included in the display panel 1410 (e.g., a light emitting element, a transistor, etc.).

In addition, in an embodiment, the sensor module 1610 may generate an electrical signal or a data value corresponding to an internal state or an external state of the electronic device 1000. The sensor module 1610 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biosensor, a temperature sensor, a humidity sensor, or an illuminance sensor.

In an embodiment, the antenna module 1620 may include at least one antenna configured to transmit a signal or a power to the outside or receive the signal or the power from the outside. According to an embodiment, the communication module 1730 may transmit the signal to the external electronic device or receive the signal from the external electronic device through an antenna suitable for a communication scheme. An antenna pattern of the antenna module 1620 may be integrated into one of the components of the display module 1400 (e.g., the display panel 1410), the input sensor 1610-2, or the like.

In an embodiment, the sound output module 1630 may be a device configured to output a sound signal to the outside of the electronic device 1000, and may include, for example, a speaker used for general purposes such as multimedia playback or recording playback, and a receiver used exclusively for receiving a phone call. According to an embodiment, the receiver may be formed integrally with or separately from the speaker. A sound output pattern of the sound output module 1630 may be integrated into the display module 1400.

In an embodiment, the camera module 1710 may capture a still image and/or a moving image. According to an embodiment, the camera module 1710 may include at least one lens, image sensor, or image signal processor. The camera module 1710 may further include an infrared camera capable of measuring presence or absence of the user, a location of the user, a line of sight of the user, and/or the like.

In an embodiment, the light module 1720 may provide a light. The light module 1720 may include a light emitting diode or a xenon lamp. The light module 1720 may operate in conjunction with the camera module 1710, or may operate independently.

In an embodiment, the communication module 1730 may support establishing a wired or wireless communication channel between the electronic device 1000 and the external electronic device 2000, and may support performing communication through the established communication channel. The communication module 1730 may include one or both of a wireless communication module such as a cellular communication module, a short-range wireless communication module, or a global navigation satellite system (GNSS) communication module and a wired communication module such as a local area network (LAN) communication module or a power line communication module. The communication module 1730 may communicate with the external electronic device 2000 through a short-range communication network such as Bluetooth, Wi-Fi direct, or infrared data association (IrDA) or a long-range communication network such as a cellular network, the Internet, or a computer network (e.g., LAN or WAN). Various types of the communication modules 1730 described above may be implemented as a single chip, or may be implemented as separate chips, respectively.

In an embodiment, the input module 1300, the sensor module 1610, the camera module 1710, and/or the like may be used to control an operation of the display module 1400 in conjunction with the processor 1100.

In an embodiment, the processor 1100 may output the command or data to the display module 1400, the sound output module 1630, the camera module 1710, or the light module 1720 based on the input data received from the input module 1300. For example, the processor 1100 may generate a data signal corresponding to the input data applied through the mouse, the active pen, or the like to output the generated data signal to the display module 1400, or may generate command data corresponding to the input data to output the generated command data to the camera module 1710 or the light module 1720. The processor 1100 may switch an operation mode of the electronic device 1000 to a low-power mode or a sleep mode so as to reduce a power consumed by the electronic device 1000 when the input data is not received from the input module 1300 for a predetermined period of time.

In an embodiment, the processor 1100 may output the command or data to the display module 1400, the sound output module 1630, the camera module 1710, or the light module 1720 based on sensing data received from the sensor module 1610. For example, the processor 1100 may compare authentication data applied by the fingerprint sensor 1610-1 with authentication data stored in the memory 1200, and execute an application according to a comparison result. The processor 1100 may execute a command or output a corresponding data signal to the display module 1400 based on the sensing data sensed by the input sensor 1610-2 or the digitizer 1610-3. When the sensor module 1610 includes a temperature sensor, the processor 1100 may receive temperature data of a temperature measured by the sensor module 1610, and may further perform luminance correction and the like on the data signal based on the temperature data.

In an embodiment, the processor 1100 may receive measurement data on the presence or absence of the user, the location of the user, the line of sight of the user, and/or the like from the camera module 1710. The processor 1100 may further perform the luminance correction and/or the like on the data signal based on the measurement data. For example, the processor 1100 that has determined the presence or absence of the user through an input from the camera module 1710 may output a data signal in which a luminance is corrected through the data conversion circuit 1120-2 or the gamma correction circuit 1120-3 to the display module 1400.

In an embodiment, some of the components described above may be connected to each other through a communication scheme between peripheral devices, for example, a bus, general purpose input/output (GPIO), a serial peripheral interface (SPI), a mobile industry processor interface (MIPI), or an ultra path interconnect (UPI) link so as to exchange a signal (e.g., the command or data) with each other. The processor 1100 may communicate with the display module 1400 through a prescribed interface, and may use, for example, one of the communication schemes described above, and is not limited to the communication schemes described above.

According to various embodiments, the electronic device 1000 may be various types of devices. The electronic device 1000 may include, for example, at least one of a portable communication device (e.g., a smart phone), a computer device, a portable multimedia device, a portable medical device, a camera, a wearable device, or a home appliance. The electronic device 1000 according to an embodiment is not limited to the devices described above.

In an embodiment, the invention may be applied to a display device and an electronic device including the display device. For example, the invention may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims. Moreover, the embodiments or parts of the embodiments may be combined in whole or in part without departing from the scope of the invention.

What is claimed is:

1. A display device comprising:

a display panel including pixels;

a gate driver configured to output a first gate signal for writing data voltages to the pixels and a second gate signal for applying an initialization voltage to the pixels in a misconnection detection period, wherein the first gate signal and the second gate signal include activation levels;

a data driver configured to output the data voltages to the pixels in the misconnection detection period;

a power voltage generator electrically connected to the data driver through a cable and configured to output a first power voltage to the display panel in the misconnection detection period, wherein the cable includes a first cable and a second cable; and a timing controller electrically connected to the data driver through the cable and configured to perform a protection operation by detecting misconnection of the first cable and the second cable based on the first power voltage in the misconnection detection period.

2. The display device of claim 1, wherein each of the pixels includes:

a driving transistor including a control electrode connected to a first node, a first electrode configured to receive the first power voltage, and a second electrode connected to a second node;

a first transistor including a control electrode configured to receive the first gate signal, a first electrode configured to receive the data voltages, and a second electrode connected to the first node;

a second transistor including a control electrode configured to receive the second gate signal, a first electrode connected to the second node, and a second electrode configured to receive the initialization voltage;

a storage capacitor including a first electrode connected to the first node and a second electrode connected to the second node; and a light emitting element including a first electrode connected to the second node and a second electrode configured to receive a second power voltage.

3. The display device of claim 1, wherein the misconnection detection period follows a power stabilization period and precedes a sensing period.

4. The display device of claim 3, wherein the power voltage generator is configured to not output the first power voltage to the display panel in the power stabilization period.

5. The display device of claim 3, wherein the gate driver is configured to sequentially output the first gate signal to pixel rows including the pixels in the sensing period.

6. The display device of claim 1, wherein the gate driver is configured to simultaneously output the first gate signal and the second gate signal to the pixels in the misconnection detection period.

7. The display device of claim 1, wherein the data driver is configured to not output the data voltages when the protection operation is performed, wherein the gate driver is configured to not output the first gate signal and the second gate signal when the protection operation is performed, and wherein the power voltage generator is configured to not output the first power voltage when the protection operation is performed.

8. The display device of claim 1, further comprising:

data films including the data driver and connected to the display panel;

a first source printed circuit board connected to a first part of the data films;

a second source printed circuit board connected to a second part of the data films, wherein the second part of the data films is different from the first part of the data films; and a control printed circuit board connected to the cable and including the power voltage generator and the timing controller, wherein:

the first cable connected to the first source printed circuit board; and the second cable connected to the second source printed circuit board.

9. The display device of claim 8, wherein the timing controller is configured to detect misconnection of the first cable and the second cable based on a first feedback voltage generated by feeding back the first power voltage in the first source printed circuit board and a second feedback voltage generated by feeding back the first power voltage in the second source printed circuit board.

10. The display device of claim 9, further comprising:

a first comparator configured to generate a first alert signal having a high voltage level when the first feedback voltage is greater than or equal to the second feedback voltage by a reference voltage or more; and a second comparator configured to generate a second alert signal having the high voltage level when the second feedback voltage is greater than or equal to the first feedback voltage by the reference voltage or more.

11. The display device of claim 10, wherein the timing controller is configured to generate a first sampling alert signal by sampling the first alert signal, to generate a second sampling alert signal by sampling the second alert signal, to output a final alert signal according to XOR logic based on the first sampling alert signal and the second sampling alert signal, and to perform the protection operation based on the final alert signal.

12. The display device of claim 11, wherein the timing controller is configured to generate a count value by counting a number of final alert signals having the high voltage level during a reference number of frames and perform the protection operation when the count value is greater than a reference count value.

13. A display device comprising:

a display panel including pixels;

a gate driver configured to output a first gate signal for writing data voltages to the pixels and a second gate signal for applying an initialization voltage to the pixels in a misconnection detection period, wherein the first gate signal and the second gate signal include activation levels;

a data driver configured to output the data voltages to the pixels in the misconnection detection period;

a power voltage generator electrically connected to the data driver through a cable and configured to output a first power voltage to the display panel in the misconnection detection period, wherein the cable includes a first cable and a second cable; and a timing controller electrically connected to the data driver through the cable and configured to perform a protection operation by detecting misconnection of the first cable and the second cable based on a power current of a power line to which the first power voltage is applied in the misconnection detection period.

14. The display device of claim 13, wherein the misconnection detection period follows a power stabilization period and precedes a sensing period, wherein the power voltage generator is configured to not output the first power voltage to the display panel in the power stabilization period, and wherein the gate driver is configured to sequentially output the first gate signal to pixel rows including the pixels in the sensing period.

15. The display device of claim 13, wherein the data driver is configured to not output the data voltages when the protection operation is performed, wherein the gate driver is configured to not output the first gate signal and the second gate signal when the protection operation is performed, and wherein the power voltage generator is configured to not output the first power voltage when the protection operation is performed.

16. The display device of claim 13, further comprising:

data films including the data driver and connected to the display panel;

a first source printed circuit board connected to a first part of the data films;

a second source printed circuit board connected to a second part of the data films, wherein the second part of the data films is different from the first part of the data films; and a control printed circuit board connected to the cable and including the power voltage generator and the timing controller, wherein:

the first cable connected to the first source printed circuit board; and the second cable connected to the second source printed circuit board.

17. The display device of claim 16, further comprising:

a first current sensor configured to generate a first sensing current by sensing the power current output to the first cable in the misconnection detection period; and a second current sensor configured to generate a second sensing current by sensing the power current output to the second cable in the misconnection detection period.

18. The display device of claim 17, wherein the display panel includes:

a first display region in which pixels configured to receive the data voltages from the first part of the data films are disposed; and a second display region in which pixels configured to receive the data voltages from the second part of the data films are disposed, and wherein the timing controller is configured to detect misconnection of the first cable and the second cable based on a first load of the first display region in the misconnection detection period and a second load of the second display region in the misconnection detection period.

19. The display device of claim 18, wherein the timing controller is configured to:

determine a first target current corresponding to the first load, determine a first reference current corresponding to the first target current, and perform the protection operation when the first sensing current is greater than the first reference current; and determine a second target current corresponding to the second load, determine a second reference current corresponding to the second target current, and perform the protection operation when the second sensing current is greater than the second reference current.

20. A method for inspecting a display device, the method comprising:

outputting a first gate signal for writing data voltages to pixels and a second gate signal for applying an initialization voltage to the pixels during a misconnection detection period, wherein the first gate signal and the second gate signal include activation levels;

outputting the data voltages to the pixels during the misconnection detection period;

outputting a first power voltage to a display panel including the pixels through a cable during the misconnection detection period, wherein the cable includes a first cable and a second cable; and performing a protection operation by detecting misconnection of the first cable and the second cable based on the first power voltage during the misconnection detection period.

* * * * *